United States Patent [19]
Yamamoto

[11] Patent Number: 6,122,615
[45] Date of Patent: Sep. 19, 2000

[54] SPEECH RECOGNIZER USING SPEAKER CATEGORIZATION FOR AUTOMATIC REEVALUATION OF PREVIOUSLY-RECOGNIZED SPEECH DATA

[75] Inventor: Kenji Yamamoto, Kanagawa, Japan

[73] Assignee: Fujitsu Limited, Kawasaki, Japan

[21] Appl. No.: 09/046,568

[22] Filed: Mar. 24, 1998

[30] Foreign Application Priority Data

Nov. 19, 1997 [JP] Japan ................................ 9-317919

[51] Int. Cl.[7] .......................... G10L 15/06; G10L 17/00
[52] U.S. Cl. ......................... 704/252; 704/243; 704/246
[58] Field of Search .................................. 704/231, 235, 704/246, 243, 252

[56] References Cited

U.S. PATENT DOCUMENTS

| | | | |
|---|---|---|---|
| 5,640,490 | 6/1997 | Hansen et al. ........................... | 704/254 |
| 5,712,957 | 1/1998 | Waibel et al. ........................... | 704/235 |
| 5,787,394 | 7/1998 | Bahl et al. ............................... | 704/238 |
| 5,799,273 | 8/1998 | Mitchell et al. ......................... | 704/235 |
| 5,855,000 | 12/1998 | Waibel et al. ........................... | 704/235 |
| 5,857,099 | 1/1999 | Mitchell et al. ......................... | 704/235 |
| 5,864,810 | 1/1999 | Digalakis et al. ....................... | 704/255 |
| 5,895,447 | 4/1999 | Ittycheriah et al. .................... | 704/231 |
| 5,960,447 | 9/1999 | Holt et al. ............................... | 707/500 |

OTHER PUBLICATIONS

D. A. Reynolds and L. P. Heck, "Integration of Speaker and Speech Recognition Systems," Proc. IEEE ICASSP 91, pp. 869–872, Apr. 1991.

Rivarol Vergin, Azarshid Farhat, and Douglas O'Shaughnessy, "Robust Gender–Dependent Acoustic–Phonetic Modelling in Continuous Speech Recognition Based on a New Automatic Male/Female Classification," Proc. ICSLP 96, pp. 1081–1084, Aug. 1996.

*Primary Examiner*—David R. Hudspeth
*Assistant Examiner*—Tālivaldis Ivars Šmits
*Attorney, Agent, or Firm*—Staas & Halsey

[57] ABSTRACT

A speech recognizer includes storing means for storing speech data, and reevaluating means for reevaluating the speech data stored in the storing means in response to a request from a data processor utilizing the results of speaker categorization (the results of categorization with speaker categorization means such as a gender-dependent speech model or speaker identification). Thus, the present invention makes it possible to correct the speech data that has been wrongly recognized before.

20 Claims, 22 Drawing Sheets

| Channel | Frequency range (Hz) | Points |
|---|---|---|
| 1 | 140.6 ~ 234.4 | 3 ~ 5 |
| 2 | 281.3 ~ 375.0 | 6 ~ 8 |
| 3 | 421.9 ~ 515.6 | 9 ~ 11 |
| 4 | 562.5 ~ 703.1 | 12 ~ 15 |
| 5 | 750.0 ~ 890.6 | 16 ~ 19 |
| 6 | 937.5 ~ 1078.1 | 20 ~ 23 |
| 7 | 1125.0 ~ 1359.4 | 24 ~ 29 |
| 8 | 1406.3 ~ 1640.7 | 30 ~ 35 |
| 9 | 1687.5 ~ 1968.8 | 36 ~ 42 |
| 10 | 2015.6 ~ 2296.9 | 43 ~ 49 |
| 11 | 2343.8 ~ 2718.8 | 50 ~ 58 |
| 12 | 2765.6 ~ 3140.6 | 59 ~ 67 |
| 13 | 3187.5 ~ 3656.3 | 68 ~ 78 |
| 14 | 3703.1 ~ 4218.8 | 79 ~ 90 |
| 15 | 4265.6 ~ 4875.0 | 91 ~ 104 |
| 16 | 4921.9 ~ 5578.1 | 105 ~ 119 |

*Fig. 9*

SPEECH RECOGNIZER USING SPEAKER CATEGORIZATION FOR AUTOMATIC REEVALUATION OF PREVIOUSLY-RECOGNIZED SPEECH DATA

BACKGROUND OF THE INVENTION

1. Field of the Invention

The present invention relates to a speech recognizer and a data processor using the same.

2. Description of the Related Art

Speech recognition refers to the recognition of the meaning of speech by automatically extracting and determining the most basic meaning in the information contained in the phonetic waves with an electronic data processor, an electronic circuit or the like, and speaker categorization refers to the identification of the speaker by extracting the identifying information contained in the phonetic waves.

Equipment for automatically recognizing speech has been researched for long time. Recently, a sound data input apparatus for dialog with a machine through a speech has been realized, and further development is expected.

FIG. 22 shows the structure of a speech recognizer in the related art. This conventional speech recognizer includes a sound data input part 2201, a speech segment data generating part 2202, a speech segment data processing part 2203, a speech recognition dictionary storing part 2204.

An input device such as a microphone is used for the sound data input part 2201.

The speech segment data generating part 2202 detects a speech segment from the speech data input from the sound data input part 2201 so as to generate speech segment data. The detection of the speech segment will be described in detail later.

The speech segment data processing part 2203 analyzes the speech segment data generated by the speech segment data generating part 2202 and recognizes the meaning. Conventional methods for recognizing the meaning are specifically described in "Digital Speech Process" (by S. Furui, Tokai University Publishing Association)(published in English translation as "Digital Speech Processing Synthesis and Recognition" (Marcel Dekker 1989)). Generally, a speech recognition dictionary storing part 2204 includes a phoneme dictionary and a word dictionary as dictionaries for speech recognition. In the speech recognition process, a phoneme is recognized based on the distance or the similarity between the short time spectrum of an input speech and that of the reference pattern, and the meaning of the speech is identified by a word matching the recognized phoneme sequence in the word dictionary.

However, conventional speech recognizers posed the problem that it is not easy to correct an error in the recognition of speech data.

More specifically, in the actual speech recognition made by humans, the speech data that was not recognized correctly at first can be corrected later in the context of the conversation for understanding, and the action of the people who are talking is also corrected accordingly. However, in conventional speech recognizers, it is not easy to correct the meaning of the speech once it has been recognized wrongly. Therefore, for example, in an apparatus in which a command is input by speech, it is difficult to correct an operation in the case that an erroneous command was input due to an error in the recognition of the speech data. Thus, the range for the application of speech recognizers is limited.

SUMMARY OF THE INVENTION

Therefore, with the foregoing in mind, it is the object of the present invention to provide a speech recognizer that allows a wider range of applications and a data processor using the same.

A speech recognizer of the present invention includes storing means for storing speech data, and reevaluating means for reevaluating the speech data stored in the storing means in response to a request from a data processor utilizing the results of speaker categorization.

In one embodiment of the present invention, the speech recognizer further includes speech segment data generating means for segmenting the speech data into speech segment data. The storing means stores the speech segment data generated by the speech segment data generating means.

In another embodiment of the present invention, the storing means includes a plurality of data slots for storing a plurality of sets of the speech segment data generated by the speech segment data generating means. It is of advantage to store speech data in a plurality of data slots, because that can improve the process efficiency of the reevaluation by the reevaluating means.

In still another embodiment of the present invention, the speech recognizer further includes a plurality of speech segment data generating means. The storing means includes a plurality of data slots for storing a plurality of sets of speech segment data generated for each speech segment data generating means. Such a structure makes it possible to reevaluate each speech data input from each input device, in the case that a plurality of input devices such as microphones are present.

In yet another embodiment of the present invention, the speech recognizer further includes sound power calculating means for calculating a sound power from the speech segment data stored in the storing means. The reevaluating means reevaluates only the speech segment data whose sound power calculated by the power calculating means is within a predetermined range. By excluding the speech data that cannot be recognized normally from the group of data to be reevaluated, the speech recognition accuracy can be further improved.

In another embodiment of the present invention, the speech recognizer further includes gender identifying means for identifying the gender of a speaker based on the speech segment data, and phoneme-recognition dictionary switching means for switching dictionaries so as to be suitably used for phoneme recognition, based on the results of identification of the gender identifying means. By switching the phoneme-recognition dictionaries depending on the gender, the speech recognition accuracy can be further improved.

In still another embodiment of the present invention, the speech recognizer further includes word-recognition dictionary switching means for switching dictionaries so as to be suitably used for word recognition, based on the results of identification of the gender identifying means. In some languages, for example Japanese, there is a clear distinction between the vocabulary used by males and the vocabulary used by females. When different words are generally used depending on the gender, the speech recognition accuracy can be further improved by switching the word-recognition dictionaries depending on the gender.

In yet another embodiment of the present invention, the speech recognizer further includes speaker identifying means for identifying a speaker based on the speech data.

According to another aspect of the present invention, a data processor including input receiving means for receiving an input utilizes as the input receiving means a speech recognizer comprising storing means for storing speech data, and reevaluating means for reevaluating the speech data stored in the storing means in response to a request from the data processor. When the speech recognizer of the present invention is used in the data processor to which a command can be input orally, it is possible to sequentially correct the wrong recognition of the speech data by reevaluating the speech data during the operation. Thus, an unnecessary process becomes less likely.

According to another aspect of the present invention, a data processor including input receiving means for receiving input utilizes as the input receiving means a speech recognizer comprising storing means for storing speech data, gender identifying means for identifying the gender of a speaker based on the speech data, phoneme-recognition dictionary switching means for switching dictionaries so as to be suitably used for phoneme recognition, based on the results of the identification of the gender identifying means, and reevaluating means for reevaluating the speech data stored in the storing means in response to a request from the data processor utilizing the results of speaker categorization. The data processor makes a request for reevaluation of the speech data stored in the storing means, when the phoneme-recognition dictionary switching means switches the phoneme-recognition dictionaries. Switching the phoneme-recognition dictionaries generally improves the recognition accuracy. Reevaluating the past speech data with a different phoneme-recognition dictionary can reveal errors in the recognition of the speech data.

According to another aspect of the present invention, a data processor including input receiving means for receiving an input utilizes as the input receiving means a speech recognizer comprising storing means for storing speech data, gender identifying means for identifying the gender of a speaker based on the speech data, word-recognition dictionary switching means for switching dictionaries so as to be suitably used for word recognition, based on the results of the identification of the gender identifying means, and reevaluating means for reevaluating the speech data stored in the storing means in response to a request from the data processor utilizing the results of speaker categorization. The data processor makes a request of reevaluation of the speech data stored in the storing means, when the word-recognition dictionary switching means switches the word-recognition dictionaries.

According to another aspect of the present invention, a data processor including input receiving means for receiving an input utilizes as the input receiving means a speech recognizer comprising storing means for storing speech data, gender identifying means for identifying the gender of a speaker based on the speech data, phoneme-recognition dictionary switching means for switching dictionaries so as to be suitably used for phoneme recognition, based on the results of the identification of the gender identifying means, word-recognition dictionary switching means for switching dictionaries so as to be suitably used for word recognition, based on the results of the identification of the gender identifying means, and reevaluating means for reevaluating the speech data stored in the storing means in response to a request from the data processor utilizing the results of speaker categorization. The data processor makes a request of reevaluation of the speech data stored in the storing means, when the phoneme-recognition dictionary switching means switches the phoneme-recognition dictionaries, or the word-recognition dictionary switching means switches the word-recognition dictionaries.

According to another aspect of the present invention, a recording medium readable by a computer storing a program is provided. The program allows the computer to execute the steps of segmenting speech data into speech segment data, storing the speech segment data segmented in the segmenting step in a plurality of data slots sequentially, receiving a request of reevaluation of the speech segment data from a higher system utilizing the results of speaker categorization, and reevaluating the speech segment data in response to the request.

As described above, according to the speech recognizer of the present invention and the data processor using the same, the speech data stored in the storing means for storing the speech data can be reevaluated in response to the instruction from the higher system, so that the speech data recognized wrongly can be recognized correctly later. Therefore, an unnecessary process based on the wrong recognition of the speech data can be avoided.

These and other advantages of the present invention will become apparent to those skilled in the art upon reading and understanding the following detailed description with reference to the accompanying figures.

BRIEF DESCRIPTION OF THE DRAWINGS

FIG. 9 is a diagram showing an exemplary table used for dividing the spectrum power obtained in a FFT into 16 channels on the mel scale.

DESCRIPTION OF THE PREFERRED EMBODIMENTS

Hereinafter, the present invention will be described by way of examples with reference to the accompanying drawings.

Figure 1:
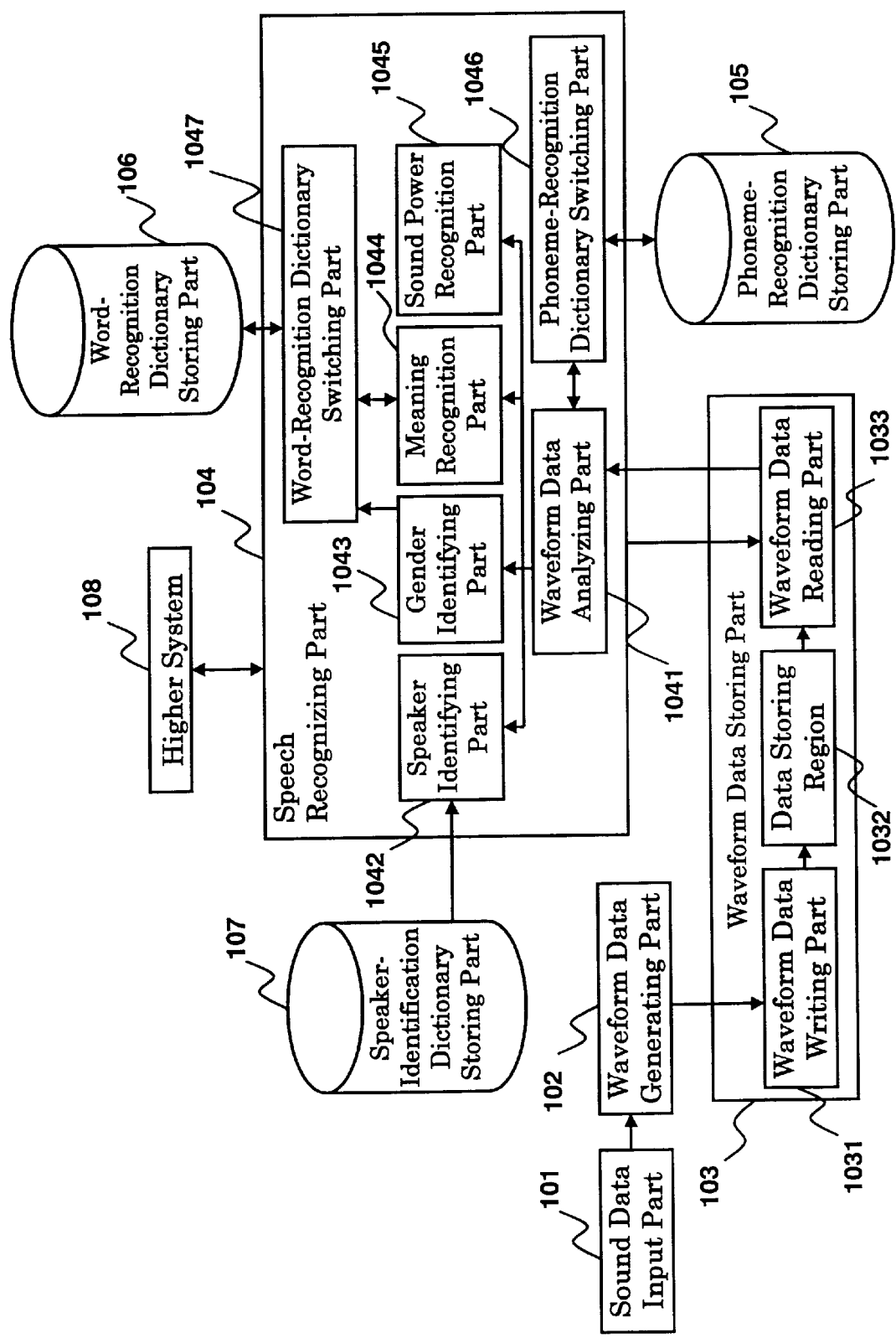
FIG. 1 is a functional block diagram showing the structure of a speech recognizer according to an example of the present invention.

FIG. 1 is a functional block diagram showing a structure of a speech recognizer according to an example of the present invention.

As shown in FIG. 1, a speech recognizer of the present example includes a sound data input part 101, a waveform data generating part 102, a waveform data storing part 103, a speech recognizing part 104, a phoneme-recognition dictionary storing part 105, a word-recognition dictionary storing part 106, and a speaker-identification dictionary storing part 107. A higher system 108 that utilizes the results of the speech recognition by the speech recognizer of the present invention receives the results of the speech recognition from the speech recognizing part 104.

An input device for receiving a sound data input, such as microphone, is used for the sound data input part 101.

The waveform data generating part 102 segments the speech data input from the sound data input part 101 into speech segments so as to generate waveform data.

In the present example, since the speech data is stored in a data storing region 1032 in the waveform data storing part 103 in the form of waveform data, only the segmentation of the speech data into speech segments is performed. However, depending on the form for storing data in the data storing region 1032, the data may be converted to a suitable storing form after the segmentation into speech segments. In this case, the waveform data generating part 102 may perform a part of the process performed by a waveform data analyzing part 1041, which is described later.

Figure 2:
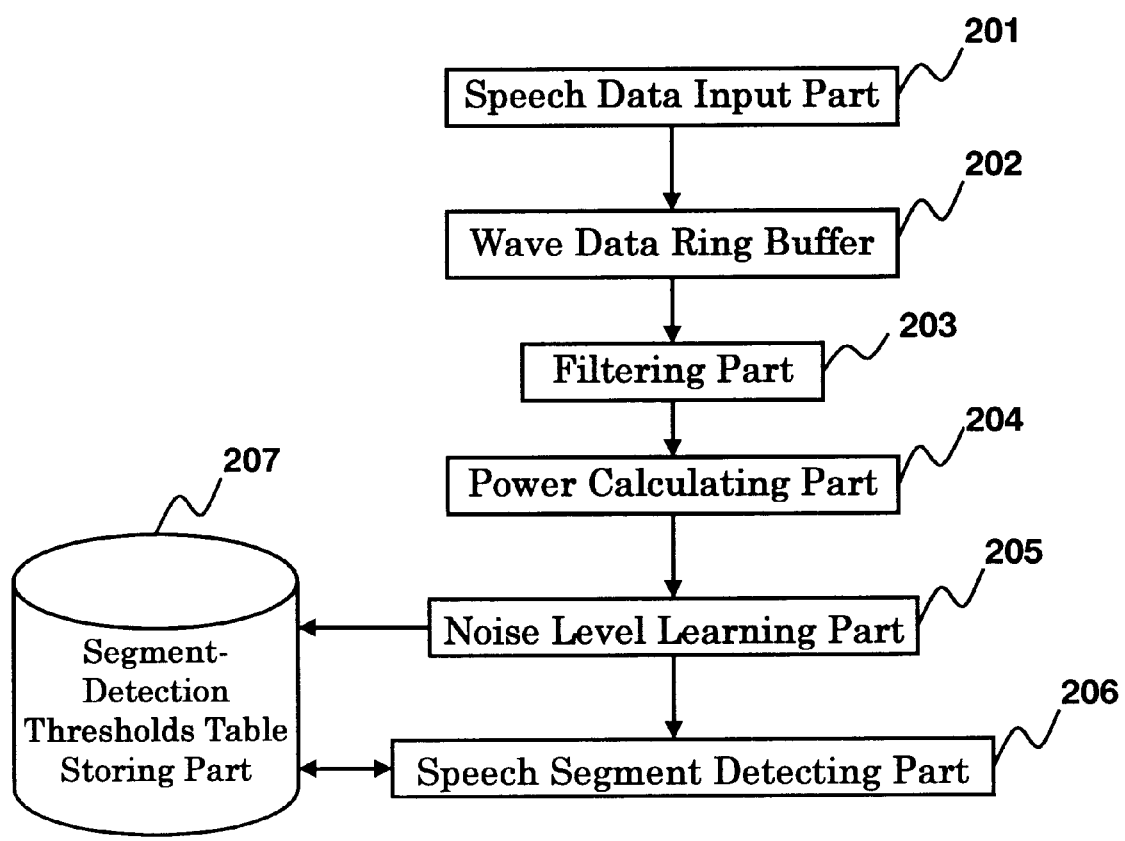
FIG. 2 is a functional block diagram showing the detailed structure of a waveform data generating part of the speech recognizer according to an example of the present invention.

FIG. 2 is a functional block diagram showing a detailed structure of the waveform data generating part 102 according to the present example of the present invention.

As shown in FIG. 2, the waveform data generating part 102 includes a speech data input part 201, a wave data ring buffer 202, a filtering part 203, a power calculating part 204, a noise level learning part 205, a speech segment detecting part 206, and a segment-detection thresholds table storing part 207.

Figure 3:
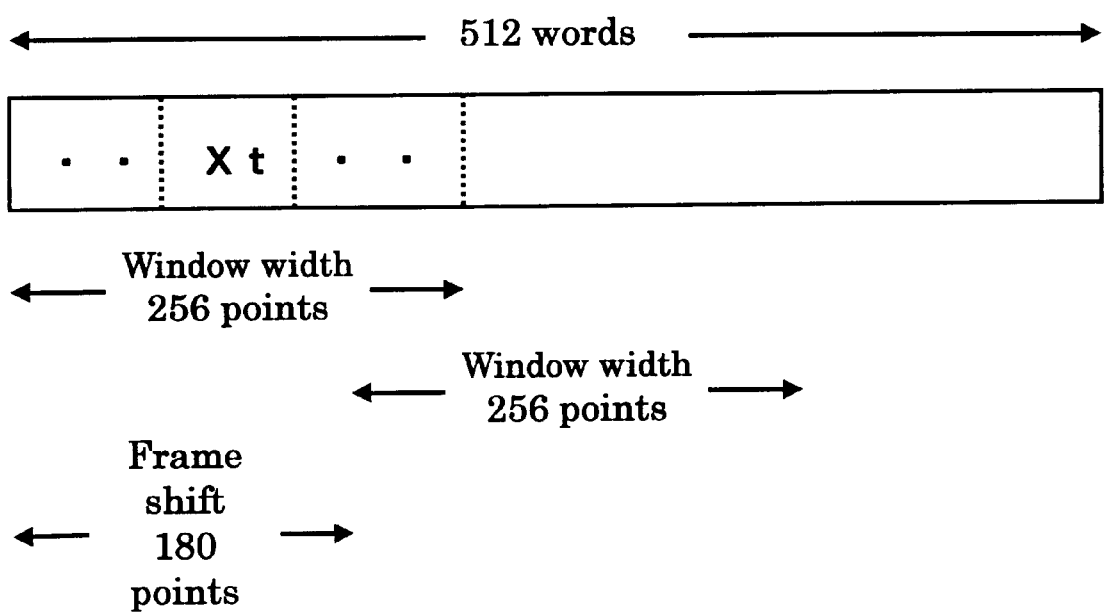
FIG. 3 is a diagram showing the structure of a wave data ring buffer according to an example of the present invention.

The speech data input part 201 samples speech data input from the sound data input part 101 at a predetermined interval and sequentially stores the results to the wave data ring buffer 202. FIG. 3 shows an exemplary structure of the wave data ring buffer 202. As shown in FIG. 3, in the present example, the wave data ring buffer 202 has a total capacity of 512 words (4 bytes per word) for buffering and stores sampled data sequentially. In the present example, a process for one frame is performed upon the acquisition of data of 256 points (window width). A frame shift (180 points) is shown in FIG. 3. The part excluded from the frame shift of 180 points in the window width of 256 points is included in the window width of the next frame. Thus, the part is included in two window widths, so that discontinuation of a word can be prevented. The frame shift is not necessarily made up of 180 points.

Figure 4:
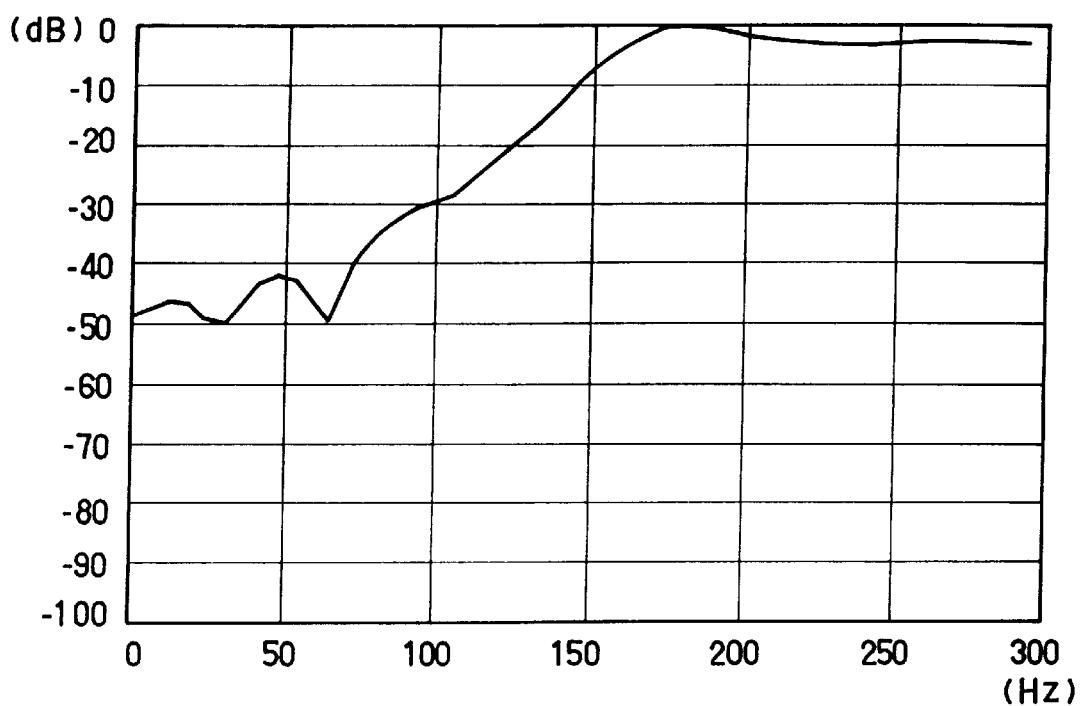
FIG. 4 is a graph showing the characteristics of a filter used in a filtering part in an example of the present invention.

The filtering part 203 emphasizes a high band with an HPF (high pass filter) of 150 Hz with respect to the waveform data stored in the wave data ring buffer 202. A four-dimensional IIR Chebyshev filter is preferably used for the HPF. FIG. 4 shows the characteristics of the HPF in the present example. The primary difference of $1-z^{-1}$, which is a z-transform, is used for the high band emphasis.

The power calculating part 204 evaluates a sound power (POW). The sound power is calculated as a value relative to the window waveform according to Equation 1 below. The window waveform herein is a square window.

(POW)=((log power after square windowing)−(log power of window waveform))*100     (Equation 1)

Hereinafter, the calculation of the sound power shown by Equation 1 above will be described more specifically. First, the log power (logpow(s)) with respect to the waveform of the $i^{th}$ window (Si) is defined in Equation 2 below.

$Logpow(s)=10*\log_{10}(\Sigma Si^2)$     (Equation 2)

Therefore, the sound power (POW) can be calculated according to $$POW = (logpow(y) - logpow(h)) * 100 \quad \text{(Equation 3)}$$
$$= logpow(y)*100 - logpow(h)*100$$
$$= 1000*\log_{10}\left(\sum yi^2\right) - 1000*\log_{10}\left(\sum hi^2\right)$$

where y represents a waveform after windowing, h represents a waveform of the window itself, and i represents the $i^{th}$ window point and is 1 to 256 in this example. Since the log power (logpow(h)) of the waveform of the window itself is constant, it can be calculated previously. On the other hand, log power $1000*\log_{10}(\Sigma yi^2)$ after windowing can be calculated according to Equation 4.

$$1000 * \log_{10}(a) = 1000 * \log_2(a) / \log_2(10) \quad (a = \Sigma yi^2) \quad \text{(Equation 4)}$$
$$\approx 301 * \log_2(a)$$
$$= 301 * (\log_2(b) + \log_2(c)) \quad (a = b*c: \ 1 \leq c < 2)$$
$$= 301 * n + 301 * \log_2(c) \quad (b = 2^n: \ 0 \leq n < 31)$$

The values of 301*n and 301*log$_2$(c) in Equation 4 can be previously calculated for every value of n and c and stored in a table. In the present example, c is accurate up to 5 digits after the decimal point.

The noise level learning part 205 learns noise levels (hereinafter also referred to as "nsl") for every predetermined interval in order to deal with the fluctuation of background noises. The noise level herein refers to the power in a soundless segment. In the noise level learning part 204, a power value that appears the most frequently during a predetermined period of time is designated as the noise level of that period. In the learning process, the noise levels are determined based on the data of 80 frames having the smallest powers among 100 frames that are examined, for the purpose of more accurately learning the data constituted only by soundless segments. In the case that the determined noise level is smaller than a predetermined value, a value previously defined as the smallest value is made a determined value. The determined noise level herein is used for determining thresholds th1 to th4 used for the detection of a segment, which is described later. The thresholds are stored in the segment-detection thresholds table storing part 207.

The speech segment detecting part 206 identifies a section where the sound power exceeds the previously defined threshold as a speech segment. At this time, in order to detect the segment more accurately, the previous state is referred to for every input frame, and the four thresholds and the sound power are compared accordingly. The method for detecting a speech segment will be more specifically described below.

Figure 5:
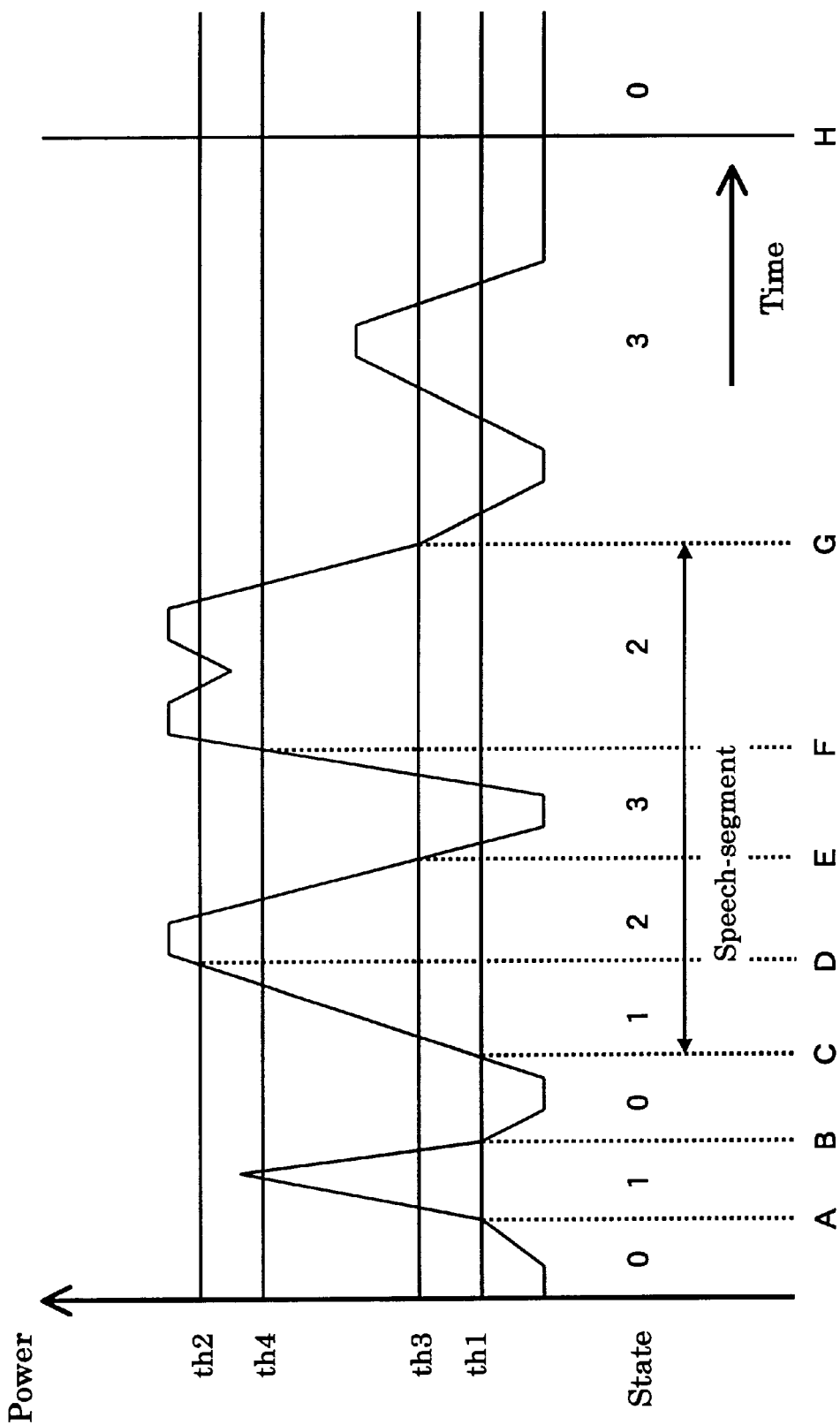
FIG. 5 is a chart showing an exemplary segmentation into speech segments in an example of the present invention.

FIG. 5 is a chart showing an exemplary detection of a speech segment.

The speech segment is detected by comparing four thresholds th1 to th4 shown in FIG. 5 with the sound power. Herein, the thresholds th1 to th4 are values obtained from the noise level nsl as described above. In the present example, th1=nsl+200, th 2=nsl+600, th3=nsl+500, and th4=nsl+600.

Figure 6:
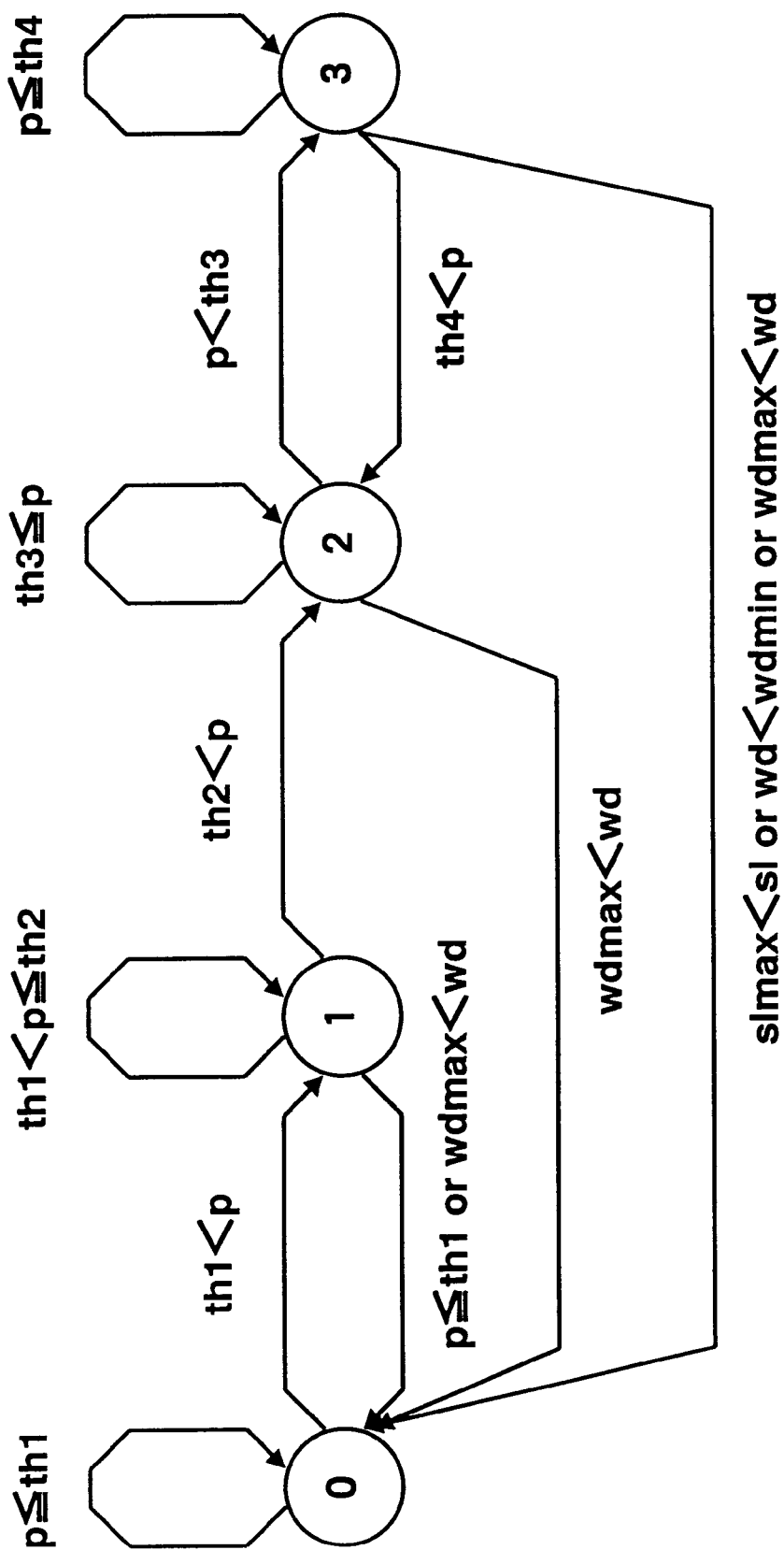
FIG. 6 is a state transition diagram for the segmentation of speech data into speech segments in an example of the present invention.

Hereinafter, the operation of the speech segment detection will be described for each frame of A to H shown in FIG. 5 with reference to FIG. 6 showing the state transition during the operation.

In frame A, when the sound power exceeds the threshold th1, a transition from state 0 to state 1 occurs. This is assumed to indicate that a candidate for the first phoneme of the speech segment is detected. However, in the example of FIG. 5, the sound power does not exceed the threshold th2 and goes down below the threshold th1 in frame B. Therefore, the segment that has been once in the state 1 is not determined as a speech segment, and a transition from state 1 to state 0 occurs.

As shown in FIG. 6, it is defined that the transition from state 0 to state 1 occurs, in the case that the sound power exceeds the threshold th1. In addition, it is defined that the transition from state 1 to state 0 occurs, in the case that the sound power becomes equal to or lower than the threshold th1, or in the case that the duration wd of the state 1 exceeds the word maximum wdmax for the purpose of discontinuing the word. Herein, the word maximum wdmax refers to a value defined as the maximum duration during which one word is uttered. The word maximum wdmax is predetermined. In the present example, wdmax is a duration of 140 frames (=about 2100 ms).

As shown in FIG. 6, in the case that the sound power becomes equal to or lower than the threshold th1 in the state 0, the state is unchanged from the state 0.

Now referring back to FIG. 5, when it is detected that the sound power exceeds the threshold th1 in frame C, a transition from state 0 to state 1 occurs. As shown in FIG. 6, in the state 1, in the case that the sound power is beyond the threshold th1 and is lower than or equal to the threshold th2, the state is unchanged from the state 1. On the other hand, in the case that the sound power exceeds the threshold th2, a transition from state 1 to state 2 occurs.

Furthermore, in the example of FIG. 5, since the sound power exceeds the threshold th2 in frame D, a transition from state 1 to state 2 occurs. A section corresponding to state 2 is recognized as part of a speech segment.

In the state 2, in the case that the sound power is beyond the threshold th3, the state is unchanged from the state 2. On the other hand, in the case that the sound power becomes lower than the threshold th3, a transition from state 2 to state 3 occurs. Furthermore, in the case that the duration wd of the state 2 exceeds the word maximum wdmax, a transition from state 2 to state 0 occurs.

In the example of FIG. 5, since the sound power becomes lower than the threshold th 3 in frame E, the transition from state 2 to state 3 occurs. The state 3 refers to a state where the end of the word may be detected. As shown in FIG. 6, in the case that the sound power again exceeds the threshold th4 in the state 3, a transition from state 3 to state 2 occurs, unless a transition from state 2 to state 0 due to the conditions described below has occurred already. A transition from state 3 to state 2 occurs upon determination that the end of the word has not been detected.

In the following cases, the transition from state 3 to state 0 occurs: in the state 3 transitioned from the state 2 due to the fact that the sound power was lower than the threshold th3, in the case that a length of a soundless period sl during which the sound power is lower than the threshold th1 exceeds the soundless maximum slmax, in the case that the duration wd of the state 2 goes lower than the word minimum wdmin; and in the case that the duration wd of the state 2 exceeds the word maximum wdmax.

It is necessary to predetermine the soundless maximum slmax and the word minimum wdmin. The definition of the soundless maximum slmax will be described later. The word minimum wdmin is defined as the minimum length of a period during which one word is uttered. More specifically, in the case that a duration wd of the state 2 is lower than the word minimum wdmin, the section in the state 2 is not regarded as part of a speech segment. In the present example, the duration of 18 frames (=about 270 ms) is defined as the word minimum wdmin, and the duration of 20 frames (=about 300 ms) is defined as the soundless maximum slmax. In the case that the sound power is equal to or lower than the threshold th4 before the transition to state 0 occurs, the state is unchanged from the state 3, if none of the above-mentioned conditions is satisfied.

In the example of FIG. 5, before the transition from state 3 to state 0 occurs, the sound power is beyond the threshold th2 in frame F. Therefore, the soundless state in the state 3 is determined to be a soundless section in the word, and the transition from state 3 to state 2 occurs again. Herein, "the soundless section in the word" refers to a portion in which there is no sound in the middle of the word. For example, this occurs in a word having double consonants such as "Hokkaido". As described above, the duration of 20 frames is defined as the soundless maximum slmaxin the present example. This means that in the case that the sound power is raised again before such a duration ends, it is determined that a soundless section is present in the word.

In the example of FIG. 5, when the sound power again becomes lower than the threshold th3 in frame G, the transition from state 2 to state 3 occurs. Thereafter, when the duration of the state 3 exceeds the soundless maximum slmax, the transition from state 3 to state 0 occurs in frame H.

The speech recognizer of the present example finally determines that the section between the frames C and G is a speech segment. Thus, the speech is segmented into speech segments.

As described above in detail, the waveform data segmented in the waveform data generating part 102 is stored in the waveform data storing part 103.

The waveform data storing part 103 includes a waveform writing part 1031, a data storing region 1032 and a waveform data reading part 1033.

The waveform data writing part 1031 is an interface part for writing the waveform data segmented in the waveform data generating part 102 in the data storing region 1032. Furthermore, the waveform data reading part 1033 is an interface part for reading the waveform data from the data storing region 1032, and transmitting it to the speech recognizing part 104.

Figure 7:
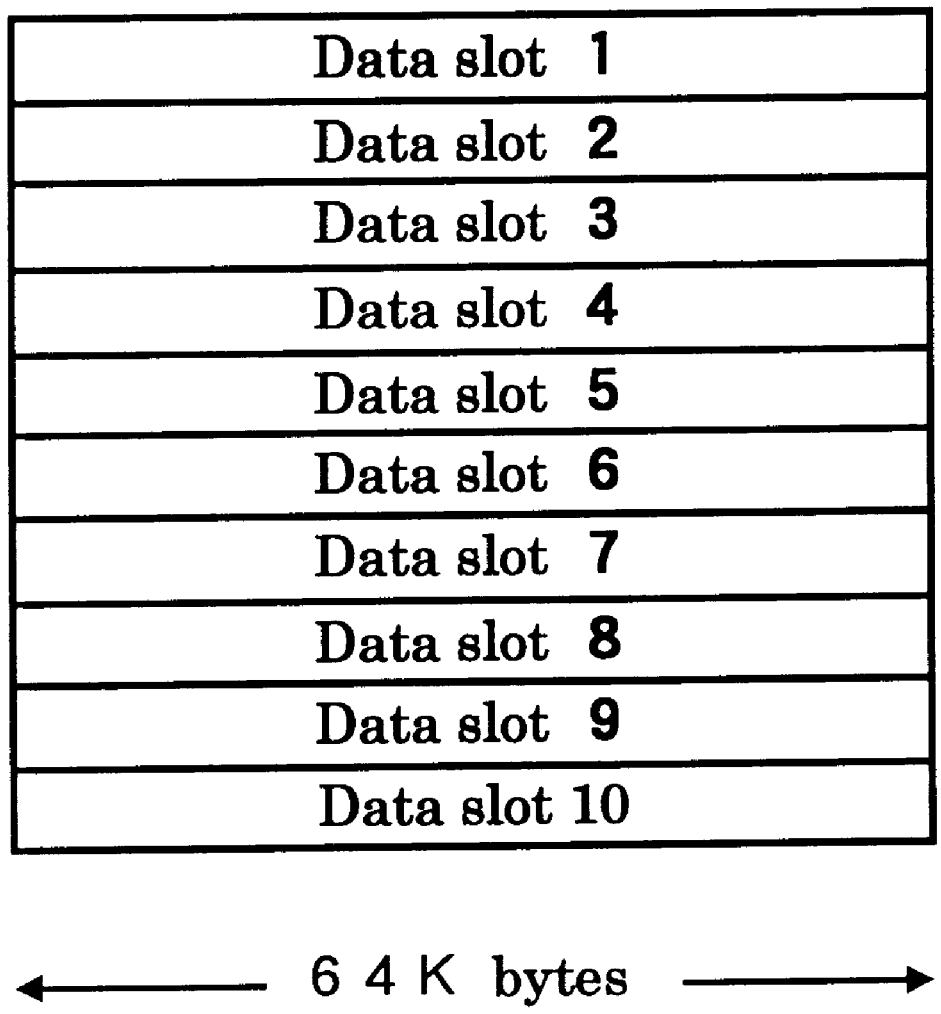
FIG. 7 is a diagram showing an exemplary structure of a data storing region of a waveform data storing part in the example of the present invention.

FIG. 7 is a diagram showing an exemplary structure of the data storing region 1032. As shown in FIG. 7, in the present example, the data storing region 1032 includes 10 data slots for storing segmented waveform data. One data slot has a capacity of 64 kilobytes. In this example, it is assumed that one word lasts 2 seconds at the maximum, and that information for 10 words can be retained. However, the size of the region is not limited thereto. Furthermore, processing efficiency is better when data is stored in the form of the data slots, but it is possible to store data in other forms. In the present example, after data is stored in the tenth data slot, data is stored in the first data slot again. Thus, data is stored circularly.

The speech recognizing part 104 analyzes waveform data read from the waveform data storing part 103 for the recognition of the meaning and the identification of the speaker. The results of the recognition are utilized by the higher system 108.

The speech recognizing part 104 in the speech recognizer of the present example analyzes the latest speech data input from the sound data input part 101 sequentially and transmits the results of the recognition to the higher system 108. In addition, the speech recognizing part 104 reevaluates the past speech data stored in the waveform storing part 103 in response to an instruction from the higher system 108.

As shown in FIG. 1, the speech recognizing part 104 in the present example includes a waveform data analyzing part 1041, a speaker identifying part 1042, a gender identifying part 1043, a meaning recognition part 1044, a sound power recognition part 1045, a phoneme-recognition dictionary switching part 1046, and a word-recognition dictionary switching part 1047.

The waveform data analyzing part 1041 analyzes the waveform data read from the waveform data storing part 103 via the waveform data reading part 1033, and transmits the results to each recognizing part.

Figure 8:
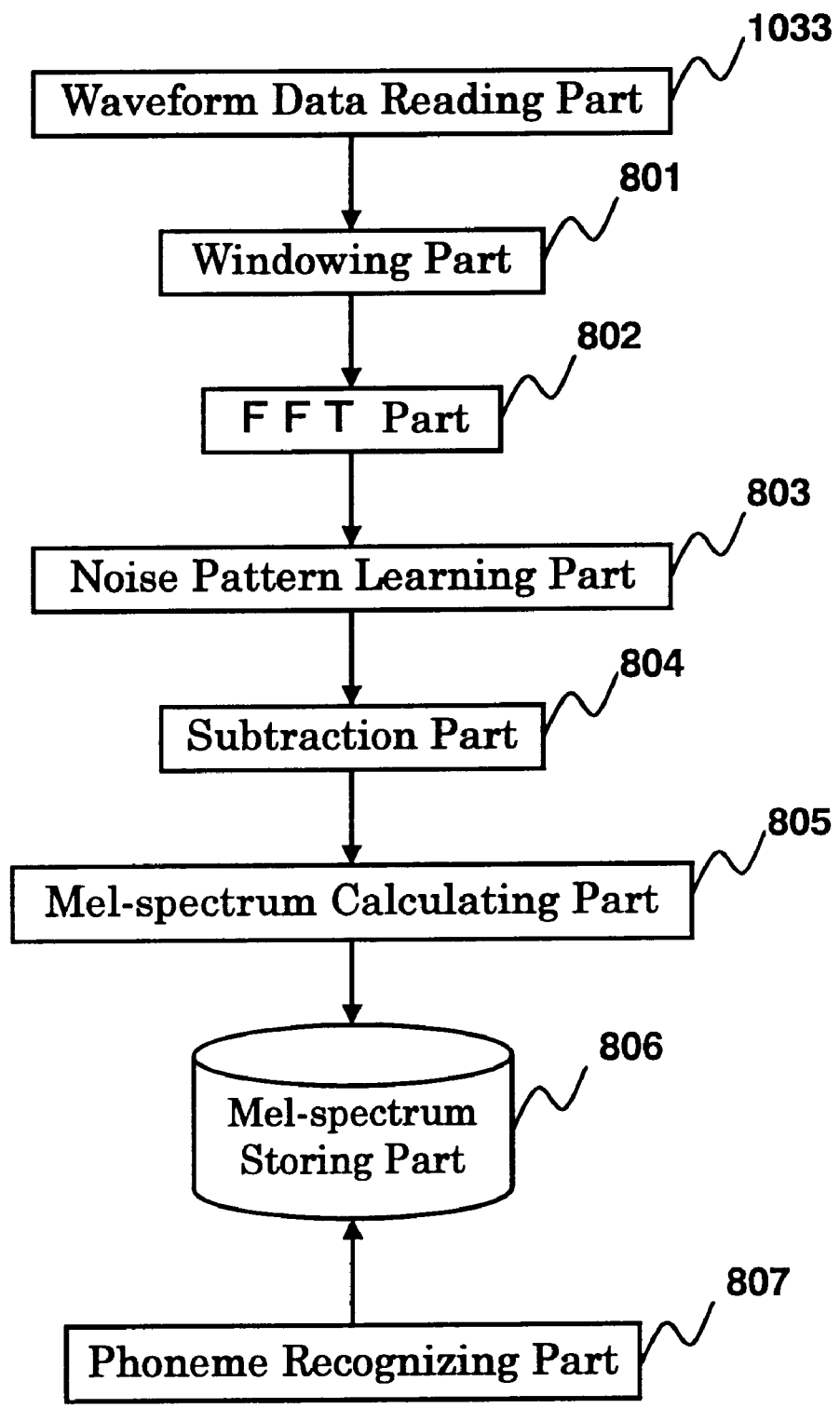
FIG. 8 is a functional block diagram showing the detailed structure of a waveform data analyzing part of the speech recognizer in an example of the present invention.

FIG. 8 is a functional block diagram showing the detailed structure of the waveform data analyzing part 1041 in the present example. As shown in FIG. 8, the waveform data analyzing part 1041 includes a windowing part 801, a FFT part 802, a noise pattern learning part 803, a subtraction part 804, a mel-spectrum calculating part 805, a mel-spectrum storing part 806, and a phoneme recognizing part 807.

The waveform data read via the waveform data reading part 1033 is first transmitted to the windowing part 801.

The windowing part 801 multiplies the read waveform data by a window waveform. The Hamming window shown in Equation 5 below is used for the window function (hi). The values of 0.56 and 0.44 in Equation 5 depend on the window's shape.

$$h_i = 0.56 - 0.44 * \cos(2\pi i/256)(0 \leq i < 256) \quad \text{(Equation 5)}$$

The window-processed waveform data is stored in storing means such as an internal RAM in order for the FFT part 802 to perform an FFT (fast Fourier transform) process.

Since the FFT process is performed by a known method (e.g., a method as described in "Digital Signal Processing" by A. Iwata, Corona Corp.), the method is not further described here. The obtained linear spectrum power (hereinafter also referred to as "linear-spc-pow") as the results of the FFT process is used for subsequent calculation.

The noise pattern learning part 803 learns the spectrum pattern of a soundless segment for every predetermined period. In the present example, a period of 10 frames (=about 150 ms) is chosen as the predetermined period.

The subtraction part 804 subtracts the just previous noise pattern from the result of the analysis of the FFT in order to deal with the background noises, as shown in $$\text{new-linear-spc-pow}_i = \max(\text{linear-spc-pow}_i - \text{noise-pattern}_i, x) \quad \text{(Equation 6)}$$

where x represents a positive number or zero that should be the minimum of the linear spectrum power, and is not fixed.

The spectrum to be obtained finally is a log power as shown in Equation 7 below. The results are stored in a RAM for subsequent processes.

$$\text{spc-pow}_i = 1000 * \log_{10}(\text{new-linear-spc-pow}_i) \quad \text{(Equation 7)}$$

The mel-spectrum calculating part 805 divides the spectrum power obtained in the FFT part 802 into 16 channels on the mel scale. The division is performed according to the table shown in FIG. 9.

Furthermore, the accumulate value (mel-spc$_j$) of the channel power is calculated for each channel according to $$mel - spc_j = \left( \sum_{i=s(j)}^{e(j)} spc - pow_i \right) / n(j) \quad \text{(Equation 8)}$$

where s(j) (j=1 to 16) represents the minimum frequency point number of each channel, e(j) represents the maximum frequency point number of each channel, and n(j) represents the total number of frequency points of each channel.

Each of e(j) and n(j) are stored in the form of a table. Next, for normalization, a difference from the average spectrum of the 16 channels is obtained. This process is performed according to Equations 9 and 10.

$$mel - ave = \left(\sum_{j=1}^{16} mel - spc_j\right) \bigg/ 16 \quad \text{(Equation 9)}$$

$$mel\text{-}spc_j = mel\text{-}spc_j - mel\text{-}ave \quad \text{(Equation 10)}$$

The mel-spectrum (mel-spc$_j$) which is the final analysis result is stored in the mel-spectrum storing part 806. The mel-spectrum stored in the mel-spectrum storing part 806 is recognized as a collection of speech data as a result of the phoneme recognition in the phoneme recognizing part 807.

The phoneme recognizing part 807 performs a predetermined process to the mel-spectrum stored in the mel-spectrum storing part 806 so as to find a matched phoneme in the phoneme-recognition dictionary stored in the phoneme-recognition storing part 105, and thus recognizes the phoneme. The phoneme recognition here refers to a process, for example, to recognize an uttered sound as "a", "i","u", etc. As a result of such a process, the finally segmented waveform data is recognized as a collection of phonemes, namely, a word. Since the process of phoneme recognition is known, it is not further described here (a technique is disclosed e.g., in Electronic Information Communication Society Proceedings D-II, Vol.J 77-D-II, No. 3, pp. 475–482).

Using the results of the mel-spectrum and the phoneme recognition obtained by the process of the waveform data analyzing part 1041 specifically described above, a variety of speech recognizing processes are performed. The procedures of each recognizing part will be described below.

The speaker identifying part 1042 identifies the speaker. Herein, the speaker identification refers to a process to identify the person who spoke. The dictionary information used for a comparing process in the speaker identification is stored in the speaker-identification dictionary storing part 107.

The methods for the speaker identification are not further described here, because many speaker recognition methods are already described in other documents (e.g., "A ROBUST, SEGMENTAL METHOD FOR TEXT INDEPENDENT SPEAKER IDENTIFICATION" by Herbert Gish, Michael Schmidt, and Angela Mielke (Proc. ICASSP 94, April 1994, Adelaide, South Australia, pp. 145–148), "IDENTIFICATION OF SPEAKERS ENGAGED IN DIALOG" by George Yu, and Herbert Gish (Proc. ICASSP 93, April 1993, Minneapolis, Vol II, pp. 383–386), "Robust Discrimination in Automatic Speaker Identification" by Herbert Gish (Proc. ICASSP 90, April 1990, Albuquerque, pp. 289–292).

The gender identifying part 1043 identifies the gender of the speaker. The speaker is identified as a male, a female or a child by the examination of the pitch, which is a generally known method. In the present example where the word dictionary is switched depending on the gender, the results of the gender identification are transmitted to the word-recognition dictionary switching part 1047.

The meaning recognition part 1044 recognizes the meaning of the dialog. In other words, as a result of the phoneme recognition, the meaning recognition part 1044 recognizes whether or not the speech data recognized as a word is a word that makes sense with reference to the word-recognition dictionary. More specifically, the meaning recognition part 1044 performs a process to select the most suitable word that makes sense from the word-recognition dictionary by matching the consecutive phoneme data obtained as a result of the phoneme recognition with a word that is registered in the word-recognition dictionary. The methods for the word recognition are not further described here, because a method that is described in the above-mentioned document (Electronic Information Communication Society Proceedings D-II, Vol.J 77-D-II, No. 3, pp. 475–482) can be used.

The sound power recognition part 1045 identifies the waveform data having a sound power unsuitable for speech recognition, and instructs the waveform data analyzing part 1041 not to use such unsuitable waveform data. The method for calculating the sound power is not described in detail here, because it has been already described in detail. The waveform data having a sound power unsuitable for speech recognition here refers to, for example data having an excessively large sound power or data having an excessively small sound power.

The phoneme-recognition dictionary switching part 1046 switches the phoneme-recognition dictionary. In the present example, although not shown, the phoneme-recognition dictionary is switched based on the gender determined by the gender identifying part 1043.

The word-recognition dictionary switching part 1047 switches the word-recognition dictionary. As described above, in the speech recognizer in the present example, the word-recognition dictionary is switched based on the gender determined by the gender identifying part 1043. Therefore, the word-recognition dictionary switching part 1047 switches the word-recognition dictionary based on the gender determined by the gender identifying part 1043.

Herein, word recognition refers to recognition as to whether or not the speech data recognized as a word as a result of the phoneme-recognition is a word that makes sense. More specifically, speech recognition refers to the selection of the most suitable word that makes sense from the word-recognition dictionary by matching the consecutive phoneme data obtained as a result of the phoneme recognition with a word that is registered in the word-recognition dictionary. Since males and females generally use different words or they have other differences, the recognition accuracy can be improved by selecting the appropriate dictionary from the dictionaries for males and females or children. Therefore, in the present example, the phoneme-recognition dictionary and the word-recognition dictionary are switched depending on the gender.

Each of the phoneme-recognition dictionary storing part 105, the word-recognition dictionary storing part 106, the speaker-identification dictionary storing part 107 includes a dictionary for female and children speakers and a dictionary for male speakers.

The speech recognizer in the present example has the function of reevaluating the past waveform data stored in the waveform data storing part 103 in response to the instruction of reevaluation from the higher system 108. The procedures of the speech recognizing part 104 when reevaluating the waveform data in response to the instruction from the higher system 108 will be described below.

Figure 10:
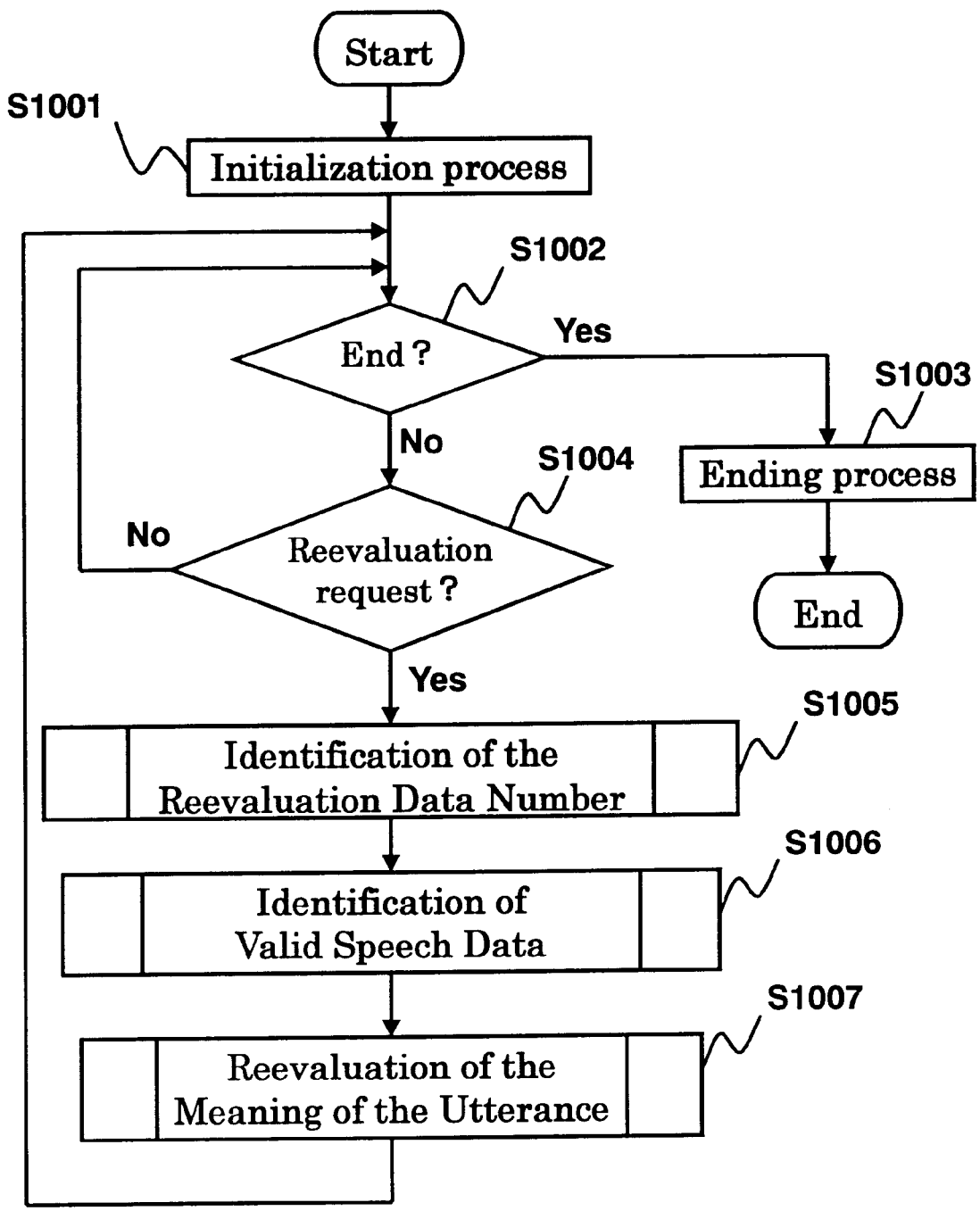
FIG. 10 is a flow chart showing the procedure of a speech recognizing part when reevaluating speech data in the speech recognizer in an example of the present invention.

FIG. 10 is a flow chart showing the procedure of the speech recognizing part 104 when reevaluating the waveform data.

As shown in FIG. 10, the speech recognizing part 104 performs an initialization process (S1001). More specifically, the initialization process refers to a clearing process of a memory area or the like.

The speech recognizer in the present example determines whether or not a notice of an operation end is received from the higher system (S1002). In the case that a notice of the end is received (S1002: Yes), a termination process is performed (S1003) so as to end the operation.

In the case that the notice is not received (S1002: No), it is determined whether or not a request for reevaluation is made by the higher system 108 (S1004). In the case that a request for reevaluation is made (S1004: Yes), first the number of data to be reevaluated is identified (S1005).

Figure 11:
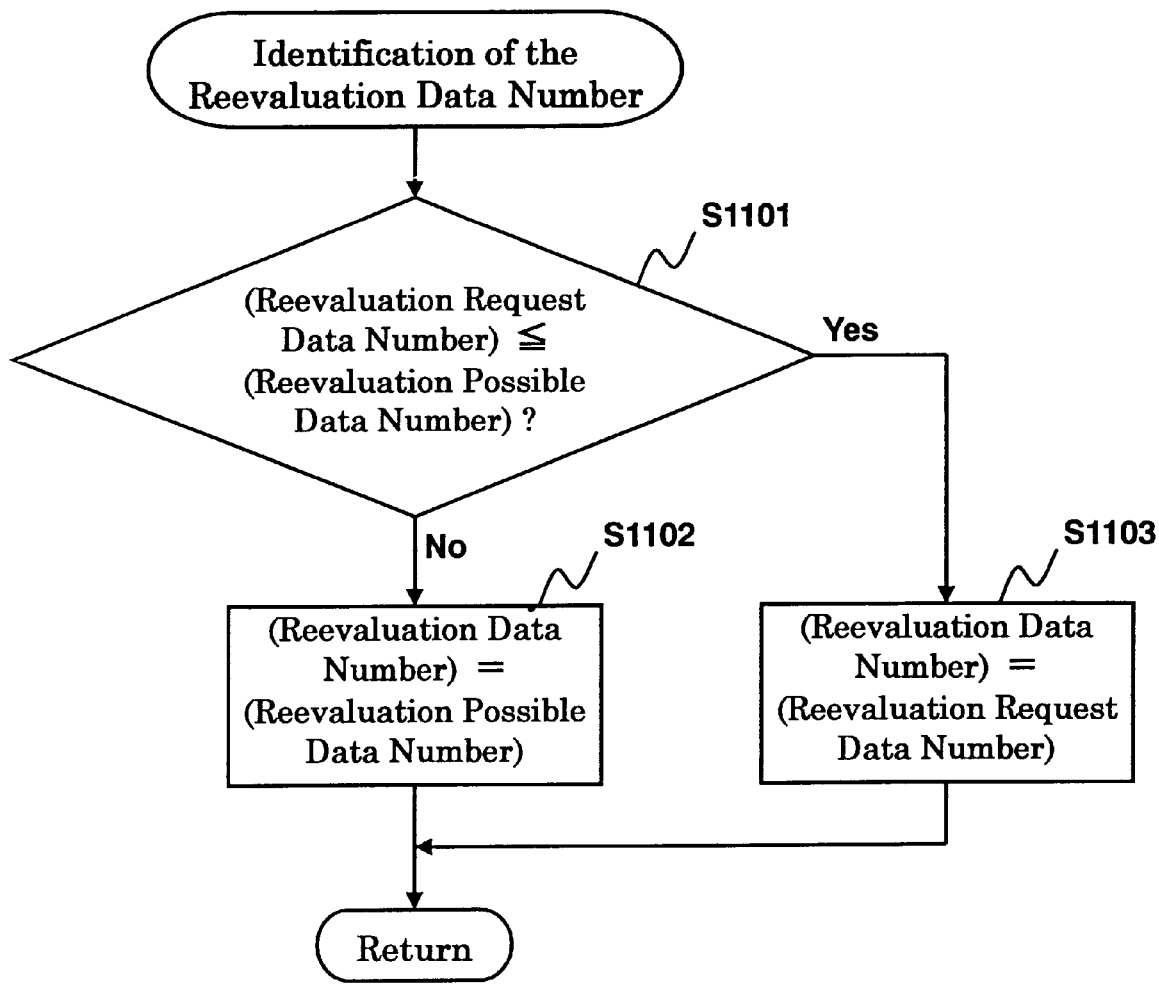
FIG. 11 is a flow chart showing the detailed procedure of a reevaluation data number identifying process in an example of the present invention.

FIG. 11 is a flow chart showing the procedure of the process of identifying the reevaluation data number in detail. As shown in FIG. 11, in the process of identifying the reevaluation data number, first the reevaluation request data number is compared with the reevaluation possible data number (S1101). The reevaluation request data number refers to the number of data whose reevaluation is requested, for example from the higher system 108. This number varies depending on the use purpose of the higher system 108 or the like. On the other hand, the reevaluation possible data number refers to the number of waveform data that can be reevaluated in the speech recognizer of the present invention. This number varies depending on the capacity of the data storing region 1032 of the waveform data storing part 103.

In the case that the reevaluation request data number is larger than the reevaluation possible data number (S1101: No), the number of data to be reevaluated is set to the reevaluation possible data number (S1102). On the other hand, in case that the reevaluation request data number is equal to or smaller than the reevaluation possible data number (S1101: Yes), the number of data to be reevaluated is set to the reevaluation request data number (S1103), because it is possible to reevaluate the number of data requested for reevaluation.

Referring back to FIG. 10, when the number of data to be reevaluated has been identified, the speech recognizing part 104 performs a process of identifying valid speech data (S1006). The process of identifying valid speech data is a process of excluding the waveform data that apparently should not be used for speech recognition because of its unusual sound power.

Figure 12:
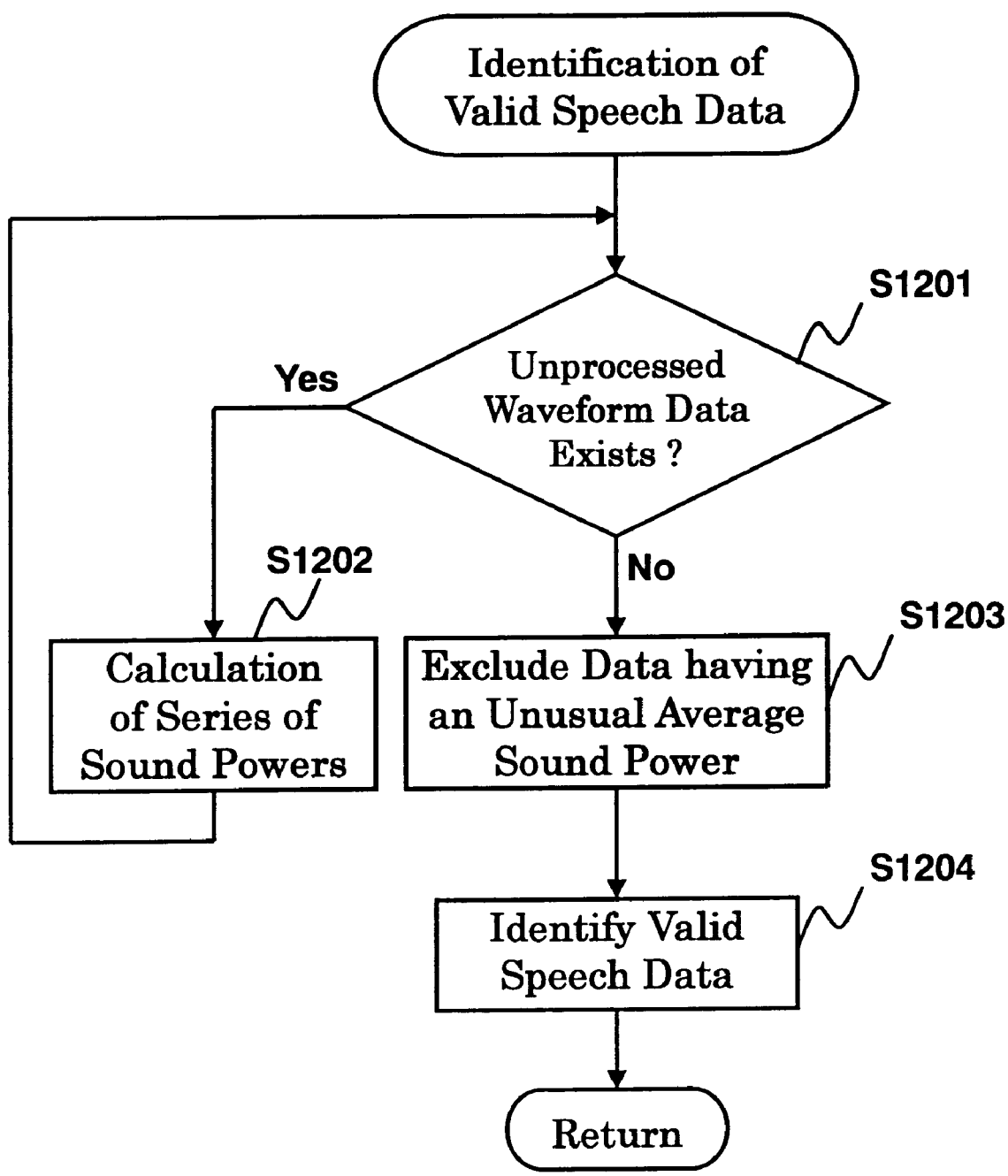
FIG. 12 is a flow chart showing the detailed procedure of a valid speech data identifying process in an example of the present invention.

FIG. 12 is a flow chart showing the procedure of the process of identifying valid speech data in detail. The speech recognizing part 104 retrieves waveform data from the waveform data storing part 103 in the number identified as the number of data to be reevaluated, and reevaluates the waveform data. First, the speech recognizing part 104 calculates a series of the sound power of waveform data in the sound power recognition part 1045 until all the retrieved waveform data are processed (S1201: Yes, S1202). The method for calculating the series of the sound power has been already described in detail, so that it is not further described here.

When the speech recognizing part 104 has calculated the series of the sound power for all the waveform data (S1201: No), the waveform data having an unusual average sound power is excluded from the group of data to be processed (S1203).

Hereinafter, a method for excluding the waveform data having an unusual average sound power will be described more specifically. In the present example, it is determined whether or not an average sound power is unusual on the basis of the following conditions. (1) An average power $A_1$ of each waveform data set stored in the data slots in the data storing region 1032 is obtained, and then the average value $A_2$ of the average power $A_1$ is obtained. In the case that the average power $A_1$ is larger than a value obtained by subtracting a predetermined value from the average value $A_2$, it is determined that the average power $A_1$ is not unusual. In other words, Equation 11 below is satisfied.

(Average power $A_1$ of each data set)>(Average value $A_2$ of average power $A_1$)−(Predetermined value) (Equation 11)

(2) The waveform is not saturated. In order words, the amplitude of the waveform data is within a predetermined range. When the conditions (1) and (2) are satisfied, the data are determined to be valid. The condition (1) is for determining that the sound power is not too small. The condition (2) is for determining that the sound power is not too large.

Figure 13:
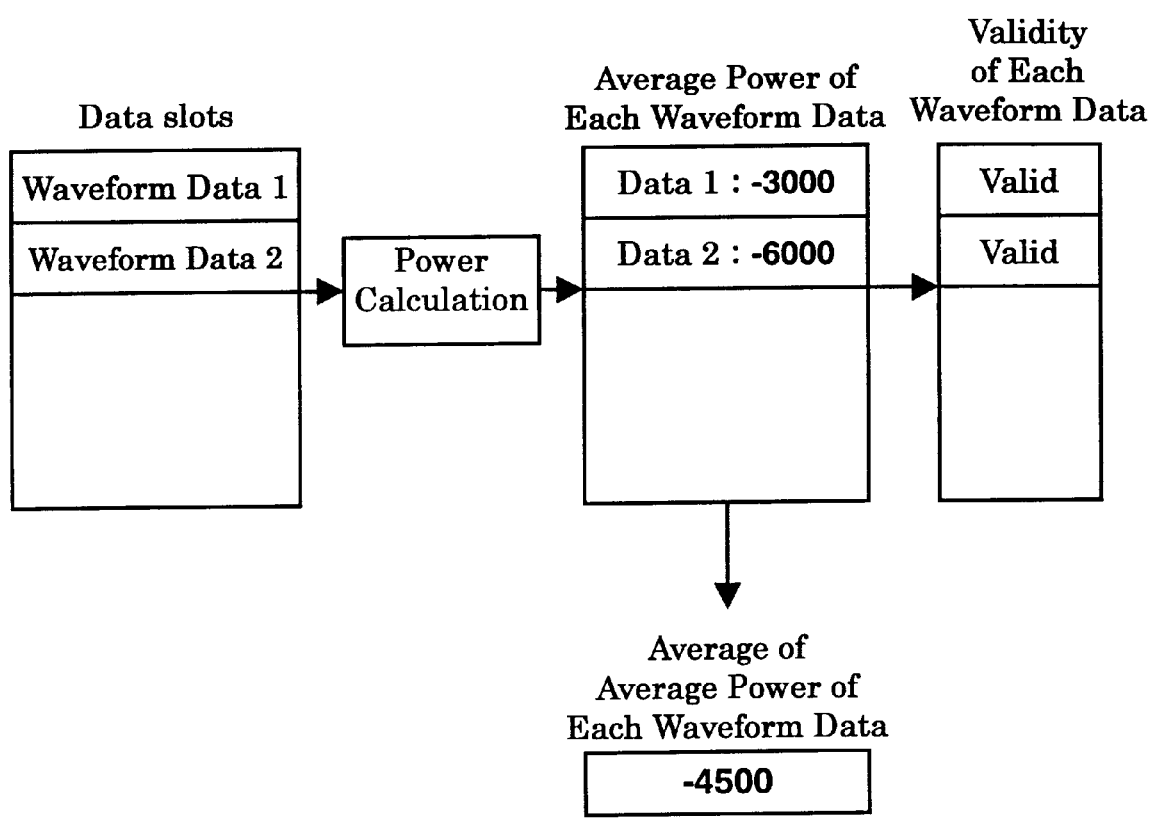
FIG. 13 is a diagram for illustrating a specific example of the determination of an average sound power in the speech reevaluation.
Figure 14:
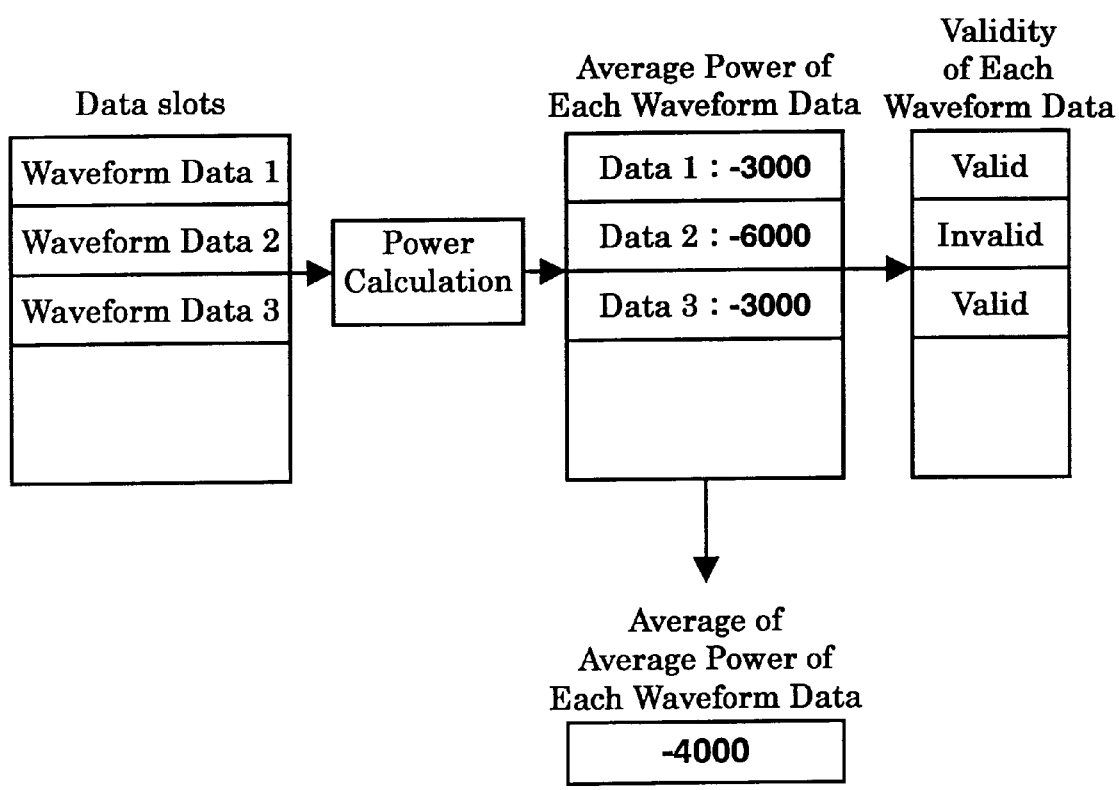
FIG. 14 is a diagram for illustrating a specific example of the determination of an average sound power in the speech reevaluation.

FIGS. 13 and 14 are diagrams for illustrating specific examples of the average sound power in the speech reevaluation. In the present example, the predetermined value in the condition (1) is defined as 2000.

As shown in FIG. 13, it is assumed that waveform data 1 and 2 are stored in the data slots in the data storing region 1032. As a result of calculating the sound power of each waveform data, when the average power of the waveform data 1 is −3000, and the average power of the waveform data 2 is −6000, the average power of all the waveform data is −4500. Since the waveform data 1 and 2 both satisfy the condition (1), they are determined to be valid speech data.

On the other hand, as shown in FIG. 14, it is assumed that waveform data 1, 2 and 3 are stored in the data slots in the data storing region 1032. As a result of calculating the sound power of each waveform data, when the average power of the waveform data 1 is −3000, the average power of the waveform data 2 is −6000, and the average power of the waveform data 3 is −3000, the average power of all the waveform data is −4000. Even if none of the waveform data 1, 2 and 3 are saturated, the waveform data 2 does not satisfy the condition (1), and thus it is determined to be invalid speech data The above-described process determines which waveform data among the waveform data stored in the data storing region 1032 has to be reevaluated. Therefore, the speech recognizing part 104 notifies information on the waveform data to be actually reevaluated, for example, which waveform data to be reevaluated (S1204). The way the notified information is utilized depends on the purpose of the use of the higher system 108 or the like.

Referring back to the flow chart of FIG. 10, when the waveform data to be reevaluated is identified by the valid speech data identifying process, the speech recognizing part 104 performs the reevaluation of the meaning of the utterance (S1007).

Figure 15:
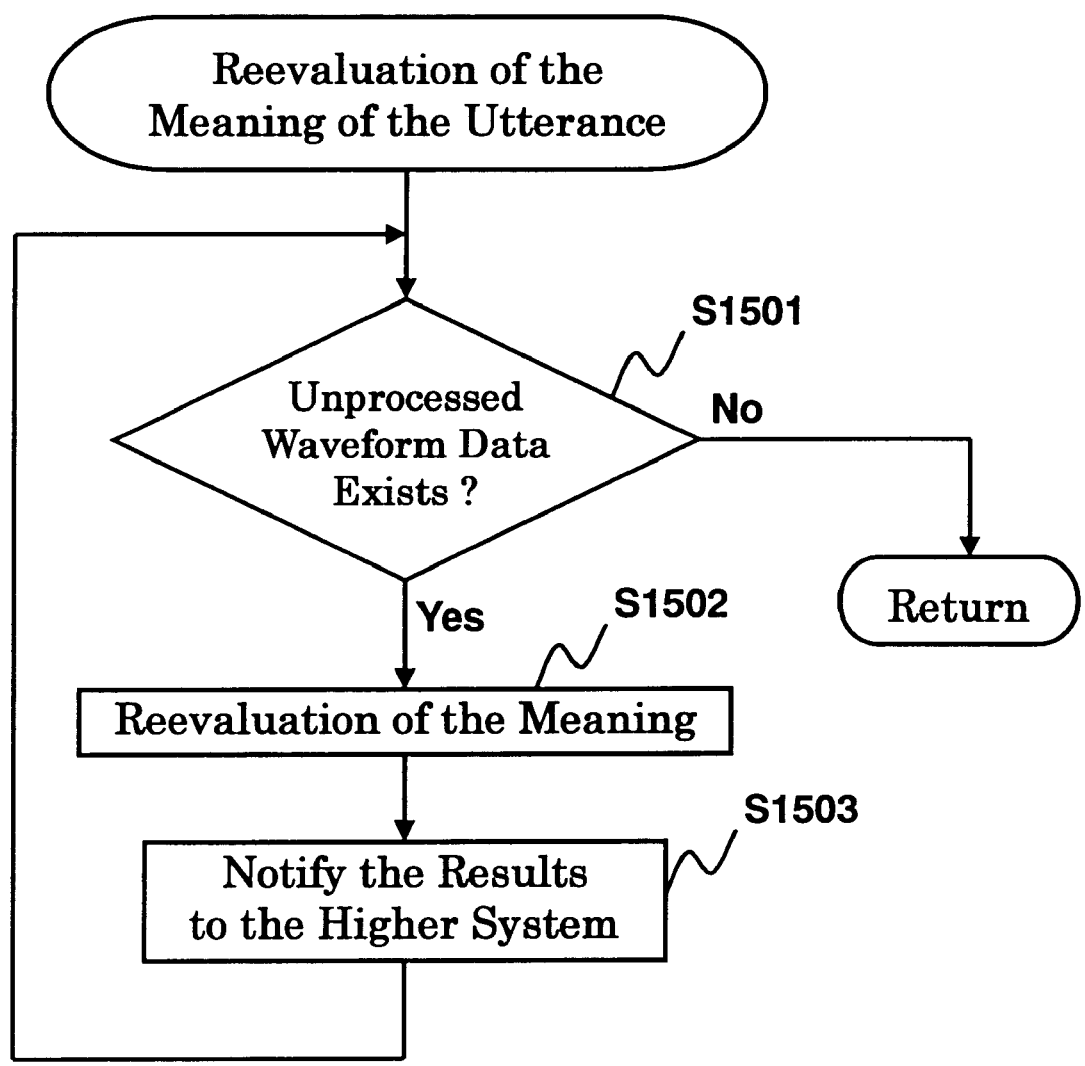
FIG. 15 is a flow chart showing the detailed procedure of an utterance meaning reevaluating process in an example of the present invention.

FIG. 15 is a flow chart showing the procedures of the process of reevaluating the meaning of the utterance in detail. As shown in FIG. 15, in the process of reevaluating the meaning of the utterance, the speech recognizing part 104 reevaluates the meaning of the utterance (S1502) and notifies the higher system 108 of the results (S1503) until the process identifying the waveform data to be processed is completed (S1501).

Next, a data processor as an application example of the speech recognizer of the present invention having the above-described structure will be described below. The present application example is obtained by applying the speech recognizer of the present invention to a data processor that can move an icon on the display screen by the input of a spoken command. The effect of the present invention will be described more specifically by describing the operation of such a data processor.

Figure 16:
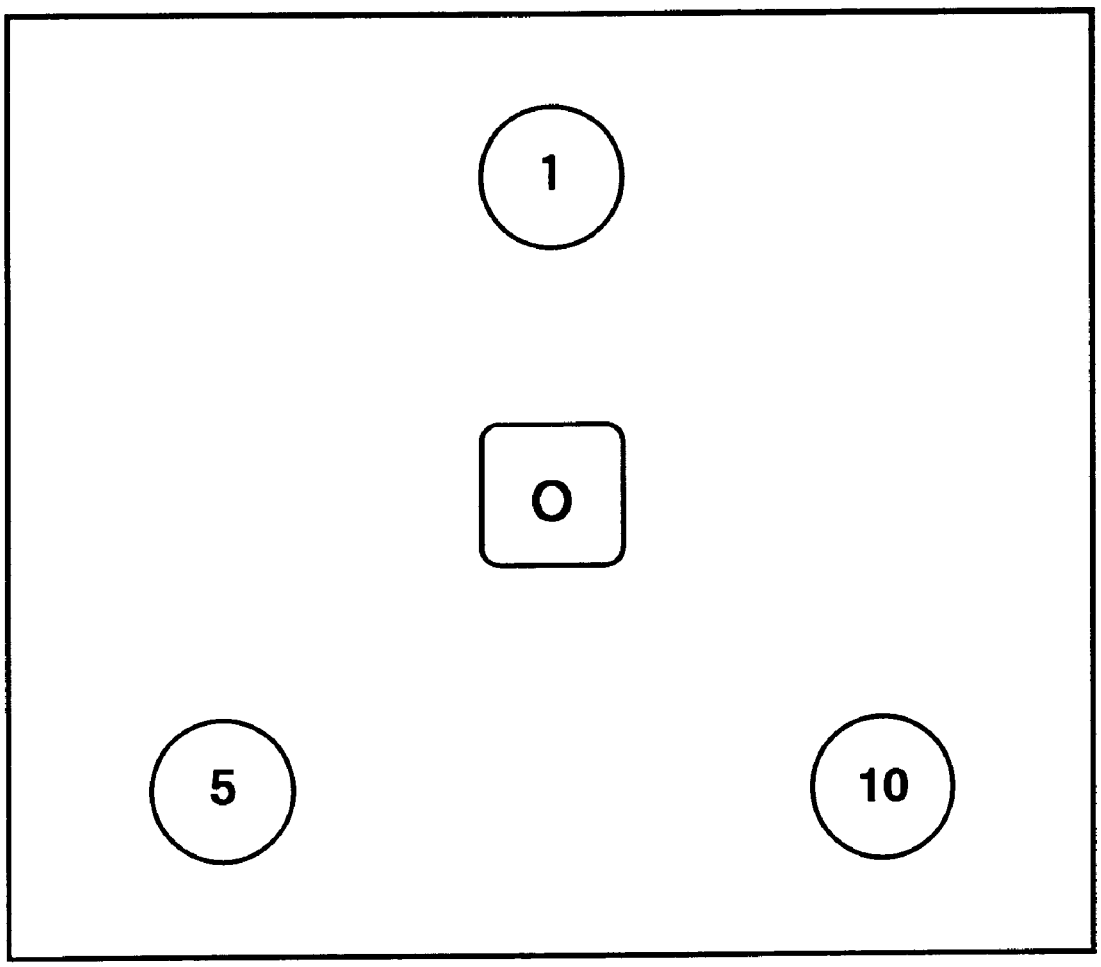
FIG. 16 is a diagram illustrating the operation of a data processor as an application example of the speech recognizer of the present invention.

FIG. 16 is a diagram showing an exemplary display screen of the data processor to which the speech recognizer of the present invention is applied. In this data processor, an icon O on the screen moves to a position 1, B or C shown in FIG. 16 by inputting a spoken command, for example, "go to 1", "go to 5", or "go to 10".

Figure 17:
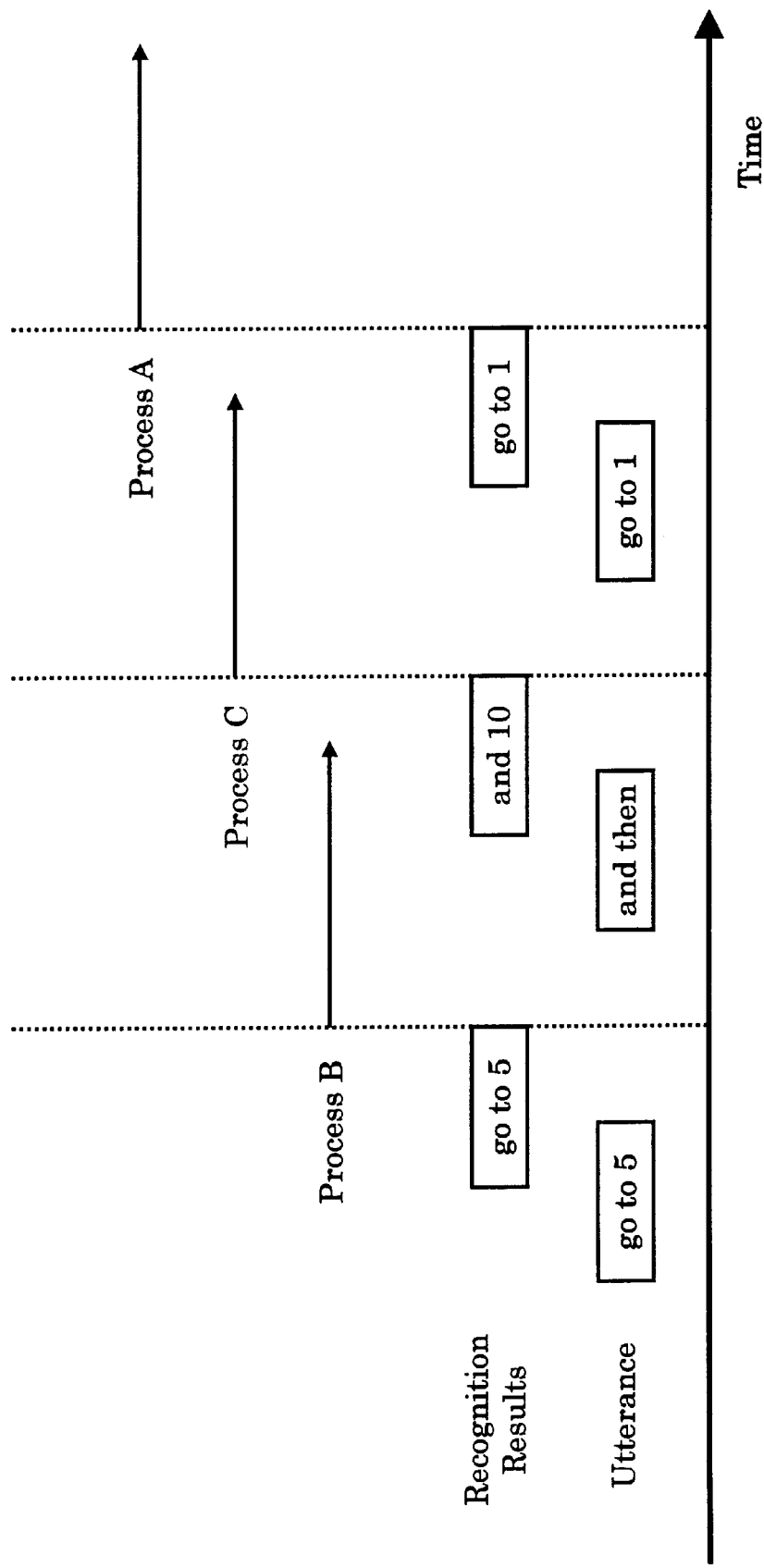
FIG. 17 is a diagram illustrating speech recognition in a data processor as an application example of the speech recognizer of the present invention.
Figure 18:
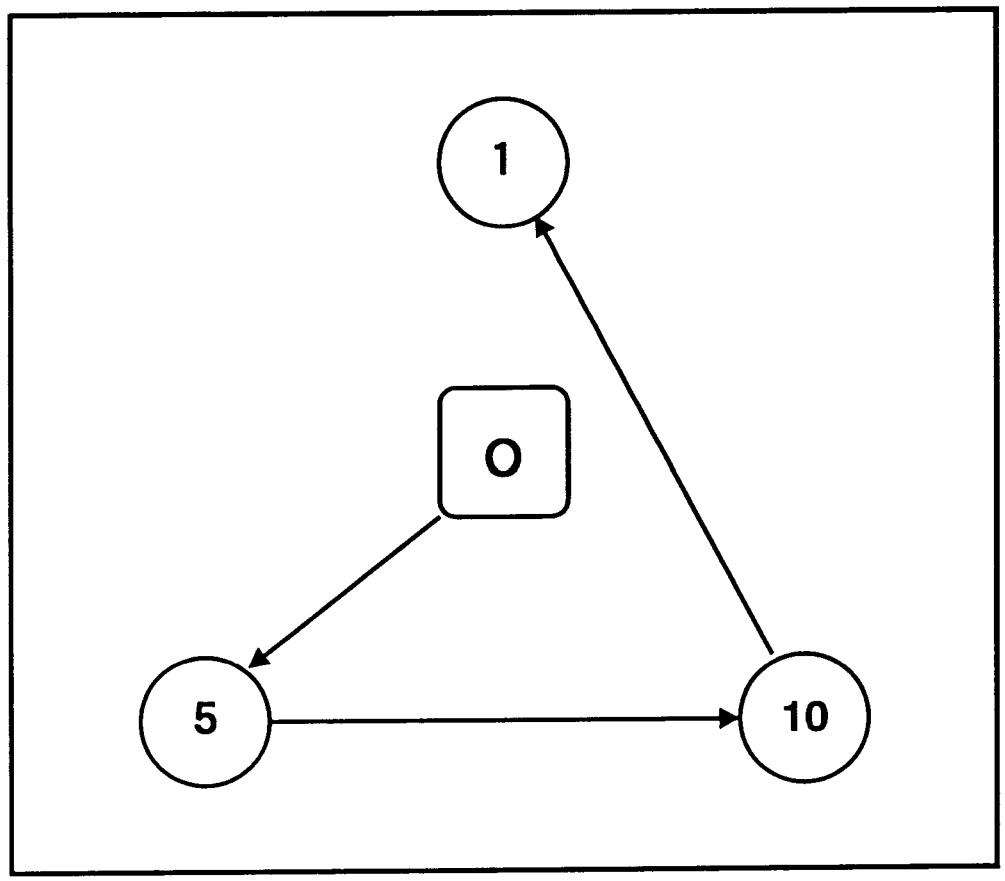
FIG. 18 is a diagram illustrating the operation of a data processor as an application example of the speech recognizer of the present invention.

Hereinafter, an example where, although "go to 5", "and then", and "go to 1 " in this order are actually uttered, the first speech recognition produces erroneous results in accordance with the utterance "go to 5", "go to 10", and "go to 1 " will be described. FIG. 17 is a diagram showing the order of the process in this case. In FIG. 17, "process A" refers to a process of moving the icon O to the position 1, "process B" refers to a process of moving the icon O to the position 5, and "process C" refers to a process of moving the icon O to the position 10. As shown in FIG. 17, it is assumed that each process starts after the meaning of the utterance is recognized. When speech recognition is performed based on the wrong recognition of the utterance, the icon on the screen first moves to the position 5, then to the position 10, and then to the position 1, as shown in FIG. 18.

However, in the case that the speech recognizer of the present invention is applied, it is possible to reevaluate the speech data. For example, it is assumed that the speech data "and then" is wrongly recognized as "go to 10" with the dictionary used commonly for males and females, and the speaker is identified as a female by the gender identifying part 1043, and accordingly the dictionary is switched to the one for females and children. At this point, the higher system 108 gives an instruction to reevaluate the speech data.

In the present application example, as described above, the higher system 108 utilizing the speech recognizer of the present invention gives an instruction to reevaluate the speech data in response to the switching of the phoneme-recognition dictionary or the word-recognition dictionary upon identification of the gender.

Figure 19:
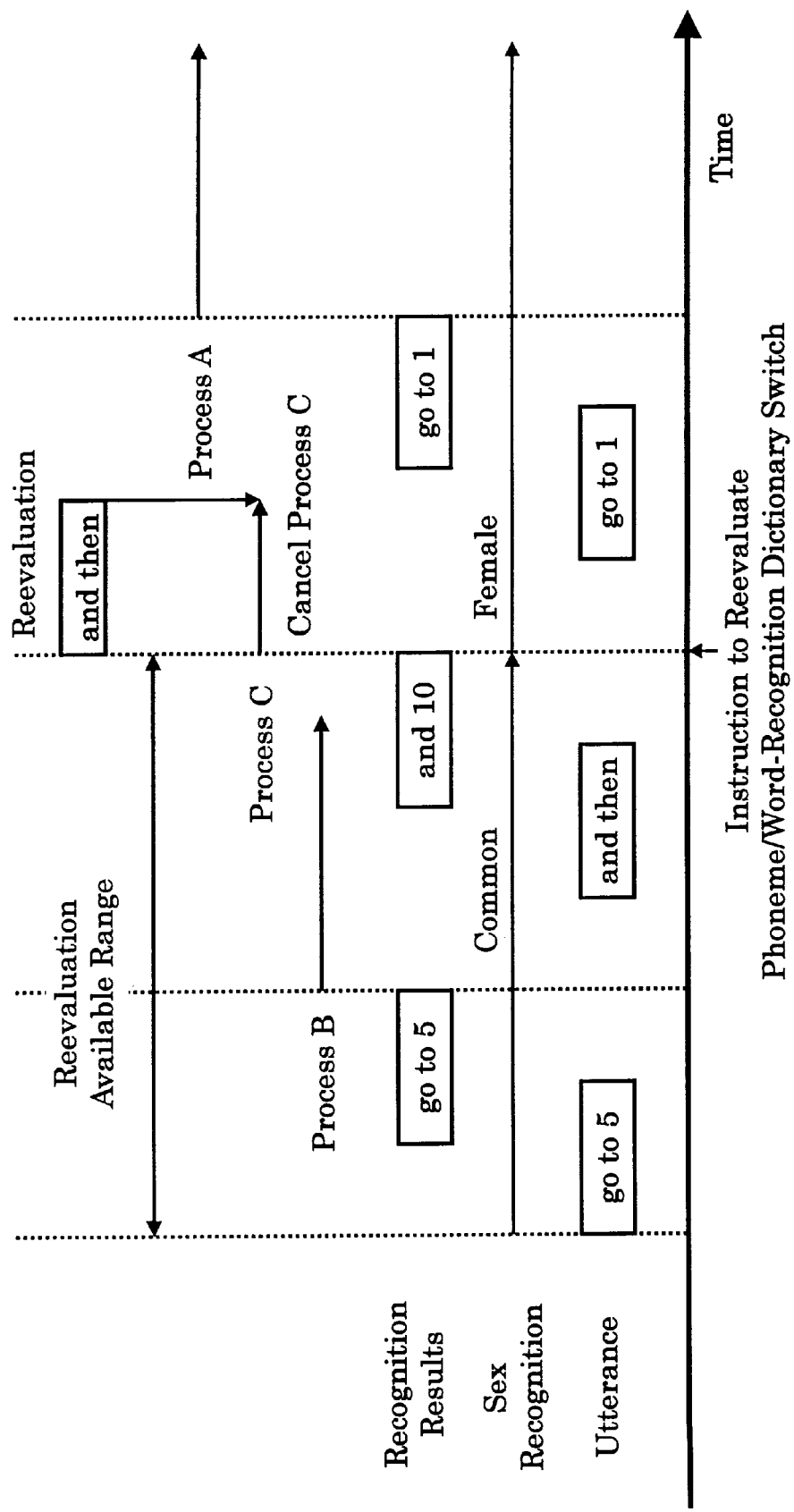
FIG. 19 is a diagram illustrating speech recognition in a data processor as an application example of the speech recognizer of the present invention.
Figure 20:
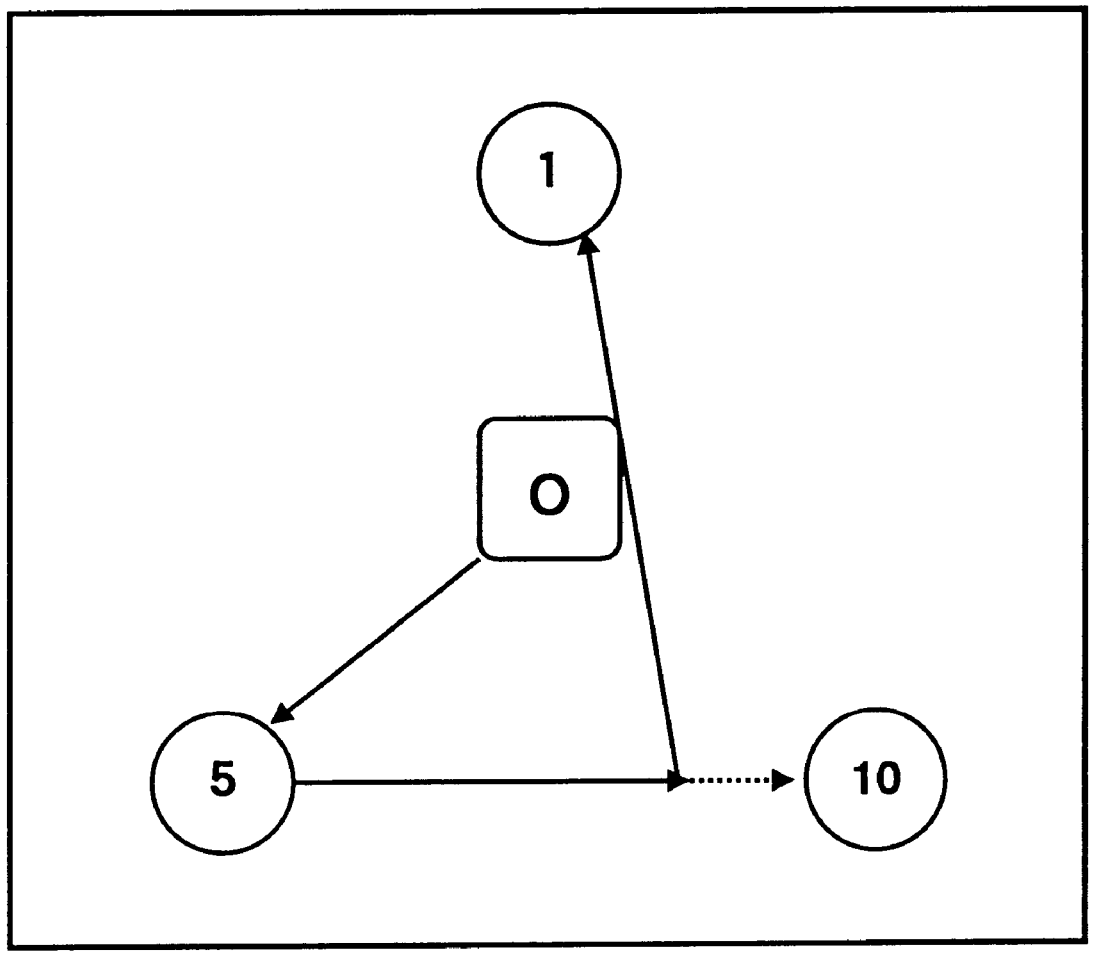
FIG. 20 is a diagram illustrating the operation of a data processor as an application example of the speech recognizer of the present invention.

FIG. 19 is a diagram showing the manner of the process in this case. As a result of the reevaluation of the speech data in response to the instruction of the reevaluation from the higher system 108, the speech data recognized as "go to 10" turns out to be the utterance "and then". As a result, if the process C is already started and the icon is moving toward the position 10 from the position 5, the process C is cancelled, and the icon starts to move toward the position 1 upon the recognition of the utterance "go to 1". The operation in this case is shown in FIG. 20.

As described above, the application of the speech recognizer of the present invention makes it possible to reduce the likelihood of an unnecessary process due to the wrong recognition of the higher system 108. In the present example, a data processor that moves an icon on a screen has been described. However, the present invention can be applied to more complicated processes as well. For example, in the case that the present invention is applied to an apparatus where a keyword for information search is input with speech, the present invention makes it possible to avoid a search process based on wrong recognition, as a result of the effect of the present invention.

Furthermore, the speech recognizer of the present example includes one sound data input part 101. However, for example, the sound data input part 101 can include a plurality of microphones so as to perform the speech recognition of the speech data input therefrom. In this case, the data storing region 1032 is divided and stores the waveform data corresponding to the sound data input part 101. With such a structure, for example, it is easy to recognize utterances by a plurality of speakers.

Furthermore, in the speech recognizer of the present invention, the understanding of the speech data is corrected later based on the results of the speech recognition. This action is performed by humans unconsciously when recognizing speech. Therefore, the speech recognizer of the present invention can be used for simulation of human intelligence with a computer.

Figure 21:
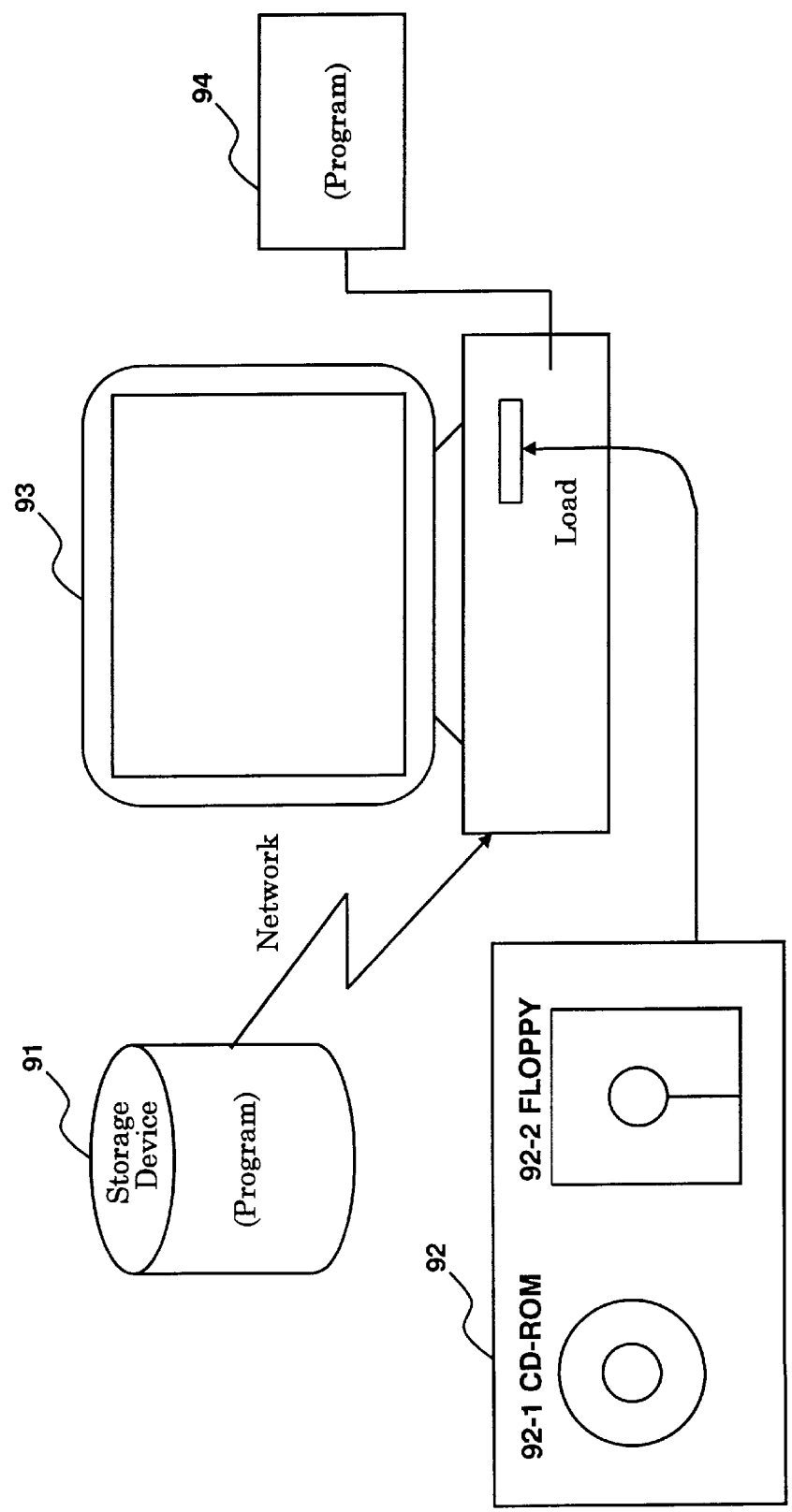
FIG. 21 is a diagram showing an exemplary recording medium.
Figure 22:
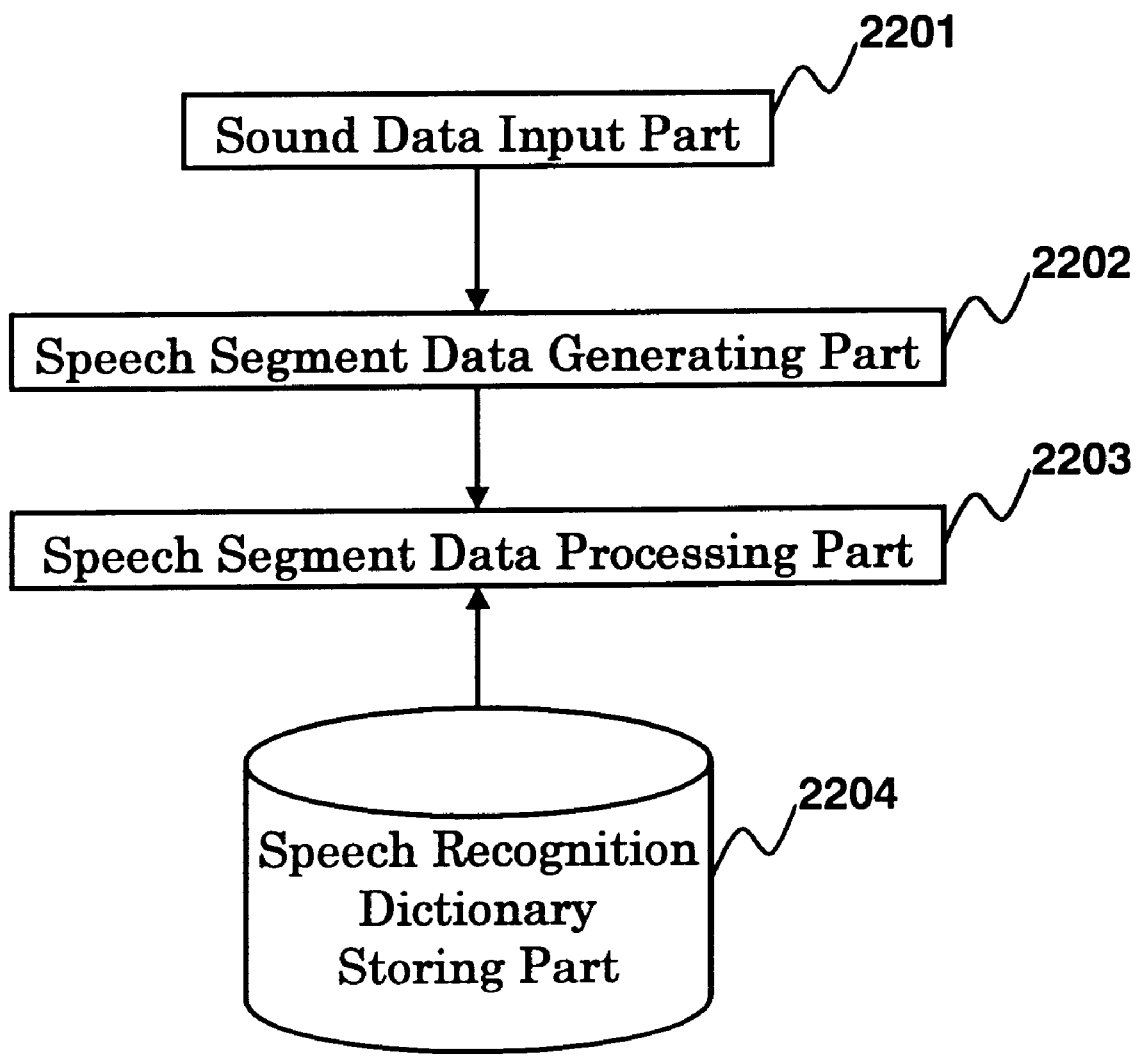
FIG. 22 is a diagram showing an exemplary structure of a speech recognizer in the related art.

Furthermore, a recording medium in which programs for realizing the speech recognizer of the present invention are recorded can be not only a transportable recording medium 92 such as a CD-ROM 92-1, a floppy disk 92-2, but also a wired storage device 91 or a fixed recording medium such as a hard disk of a computer, a RAM 94, as shown in FIG. 21. The program 94 is loaded into the main memory of a data processing device including an output device 93, and executed.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. A speech recognizer comprising:
   means for storing speech data;
   a speech recognition means for producing one or more speech recognizing results;
   means for storing the one or more speech recognition results produced by the speech recognition means;
   one or more speaker categorization means for producing one or more speaker categorization results;
   means for storing the one or more speaker categorization results produced by the speaker categorization means;
   means for linking the speech data to the speech recognition results and the speaker categorization results; and
   means for designating the speech recognition results and reevaluating the speech data corresponding to the designated speech recognition results,
      wherein the speech data is reevaluted based on at least one of the speaker categorization results at a point of time by switching to a recognition dictionary corresponding to the speaker categorization results, and the speech data corresponds to the speech recognition results that have been obtained at that point of time, at that point of time and before, or before that point of time.

2. The speech recognizer according to claim 1, further comprising speech segment data generating means for segmenting the speech data into speech segment data, wherein the storing means stores the speech segment data generated by the speech segment data generating means.

3. The speech recognizer according to claim 2, wherein the storing means includes a plurality of data slots for storing a plurality of sets of speech segment data generated by the speech segment data generating means.

4. The speech recognizer according to claim 3, further comprising a plurality of speech segment data generating means, wherein the storing means includes a plurality of data slots for storing a plurality of sets of speech segment data generated for each speech segment data generating means.

5. The speech recognizer according to claim 4, further comprising sound power calculating means for calculating a sound power from the speech segment data stored in the storing means, wherein the reevaluating means reevaluates only the speech segment data whose sound power calculated by the power calculating means is within a predetermined range.

6. The speech recognizer according to claim 5, further comprising as one of the speaker categorization means gender identifying means for identifying the gender of a speaker based on the speech segment data; and phoneme-recognition dictionary switching means for switching dictionaries so as to be suitably used for phoneme recognition, based on the results of identification of the gender identifying means.

7. The speech recognizer according to claim 6, further comprising word-recognition dictionary switching means for switching dictionaries so as to be suitably used for word recognition, based on the results of identification of the gender identifying means.

8. The speech recognizer according to claim 7, further comprising as one of the speaker categorization means speaker identifying means for identifying a speaker based on the speech data.

9. The speech recognizer according to claim 5, further comprising as one of the speaker categorization means gender identifying means for identifying the gender of a speaker based on the speech segment data; and word-recognition dictionary switching means for switching dictionaries so as to be suitably used for word recognition, based on the results of identification of the gender identifying means.

10. The speech recognizer according to claim 2, further comprising sound power calculating means for calculating a sound power from the speech segment data stored in the storing means, wherein the reevaluating means reevaluates speech segment data whose sound power calculated by the power calculating means is within a predetermined range.

11. The speech recognizer according to claim 10, further comprising as one of the speaker categorization means identifying means for identifying a speaker based on the speech segment data.

12. The speech recognizer according to claim 1, further comprising as one of the speaker categorization means gender identifying means for identifying the gender of a speaker based on the speech data; and phoneme-recognition dictionary switching means for switching dictionaries so as to be suitably used to phoneme-recognition, based on the results of identification of the gender identifying means.

13. The speech recognizer according to claim 12, further comprising word-recognition recognition dictionary switching means for switching dictionaries so as to be suitably used for word recognition, based on the results of identification of the gender identifying means.

14. The speech recognizer according to claim 1, further comprising as one of the speaker categorization means gender identifying means for identifying the gender of a speaker based on the speech data; and word-recognition dictionary switching means for switching dictionaries so as to be suitably used for word recognition, based on the results of identification of the gender identifying means.

15. The speech recognizer according to claim 1, as one of the speaker categorization means speaker identifying means for identifying a speaker based on the speech data.

16. A data processor including input receiving means for receiving an input, the data processor utilizing as the input receiving means a speech recognizer comprising:
means for storing speech data;
a speech recognition means for producing one or more speech recognition results;
means for storing the one or more speech recognition results produced by the speech recognition means;
one or more speaker categorization means for producing one or more speaker categorization results;
means for storing the one or more speaker categorization results produced by the speaker categorization means;
means for linking the speech data to the speech recognition results and the speaker categorization results; and
means for designating the speech recognition results and reevaluating the speech data corresponding to the designated speech recognition results,
wherein the speech data is reevaluted based on at least one of the speaker categorization results at a point of time by switching to a recognition dictionary corresponding to the speaker categorization results, and the speech data corresponds to the speech recognition results that have been obtained at that point of time, at that point of time and before, or before that point of time.

17. A data processor including input receiving means for receiving an input, the data processor utilizing as the input receiving means a speech recognizer comprising:
means for storing speech data;
gender identifying means for identifying the gender of a speaker based on the speech data;
phoneme-recognition dictionary switching means for switching dictionaries so as to be suitably used for phoneme recognition, based on the results of the gender identifying means;
a speech recognition means for producing one or more speech recognition results;
means for storing the one or more speech recognition results produced by the speech recognition means;
means for linking the speech data to the speech recognition results and the results of the gender identifying means; and
means for designating the speech recognition results and reevaluating the speech data corresponding to the designated speech recognition results,
wherein the data processor requests reevaluation of the speech data stored in the storing means when the phoneme-recognition dictionaries are switched by the phoneme-recognition dictionary switching means, and
wherein the speech data is reevaluted based on the results of the gender identifying means at a point of time by switching to a recognition dictionary corresponding to the results of the gender identifying means that have been obtained at that point of time, at that point of time and before, or before that point of time.

18. A data processor including input receiving means for receiving an input, the data processor utilizing as the input receiving means a speech recognizer comprising:
means for storing speech data;
gender identifying means for identifying the gender of a speaker based on the speech data;
word-recognition dictionary switching means for switching dictionaries so as to be suitably used for word recognition, based on the results of identification of the gender identifying means;
a speech recognition means for producing one or more speech recognition results;
means for storing the one or more speech recognition results produced by the speech recognition means;
means for linking the speech data to the speech recognition results and the results of the gender identifying means; and means for designating the speech recognition results and reevaluating the speech data corresponding to the designated speech recognition results, wherein the data processor requests reevaluation of the speech data stored in the storing means when the word-recognition dictionaries are switched by the word-recognition dictionary switching means, and wherein the speech data is reevaluted based on the results of the gender identifying means at a point of time by switching to a recognition dictionary corresponding to the results of the gender identifying means that have been obtained at that point of time, at that point of time and before, or before that point of time.

19. A data processor including input receiving means for receiving an input, the data processor utilizing as the input receiving means a speech recognizer comprising:

means for storing speech data;

gender identifying means for identifying the gender of a speaker based on the speech data;

phoneme-recognition dictionary switching means for switching dictionaries so as to be suitably used for phoneme recognition, based on the results of the gender identifying means;

word-recognition dictionary switching means for switching dictionaries so as to be suitably used for word recognition, based on the results of the gender identifying means;

a speech recognition means for producing one or more speech recognition results;

means for storing the one or more speech recognition results produced by the speech recognition means;

means for linking the speech data to the speech recognition results and the results of the gender identifying means; and means for designating the speech recognition results and reevaluating the speech data corresponding to the designated speech recognition results, wherein the data processor requests reevaluation of the speech data stored in the storing means when the phoneme-recognition dictionaries are switched by the phoneme-recognition dictionary switching means, or the word-recognition dictionaries are switched by the word-recognition dictionary switching means, and wherein the speech data is reevaluted based on the results of the gender identifying means at a point of time by switching to a recognition dictionary corresponding to the results of the gender identifying means that have been obtained at that point of time, at that point of time and before, or before that point of time.

20. A recording medium readable by a computer storing a program, the program allowing the computer to perform a process comprising:

segmenting speech data into speech segment data;

storing the speech segment data segmented in the segmenting step in a plurality of data slots sequentially;

receiving a request of reevaluation of the speech segment data from a higher system utilizing results of speaker categorization;

generating one or more speech recognition results by speech recognition;

generating one or more speaker categorization results by speaker categorization:

storing the one or more speech recognition results;

storing the one or more speaker categorization results;

linking the speech data to the speech recognition results and the speaker categorization results; and designating the speech recognition results and reevaluating the speech data corresponding to the designated speech recognition results, wherein the speech data is reevaluated based on at least one of the speaker categorization results at a point of time by switching to a recognition dictionary corresponding to the speaker categorization results, and the speech data corresponds to the speech recognition results that have been obtained at that point of time, at that point of time and before, or before that point of time.

* * * * *

UNITED STATES PATENT AND TRADEMARK OFFICE
CERTIFICATE OF CORRECTION

PATENT NO.: 6,122,615
DATED : September 19, 2000
INVENTOR(S): Kenji YAMAMOTO

It is certified that error appears in the above-identified patent and that said Letters Patent is hereby corrected as shown below:

Col. 17, line 46, delete "recognition" (second occurrence).

Signed and Sealed this

Seventeenth Day of April, 2001

Attest:

NICHOLAS P. GODICI

Attesting Officer

Acting Director of the United States Patent and Trademark Office